US009172590B2

(12) United States Patent
Willeke et al.

(10) Patent No.: US 9,172,590 B2
(45) Date of Patent: Oct. 27, 2015

(54) SINGLE VIRTUAL DOMAIN FIBRE CHANNEL OVER ETHERNET FABRIC

(75) Inventors: Jesse Brewster Willeke, Broomfield, CO (US); Daniel Ji Yong Park Chung, San Jose, CA (US); David Alan Peterson, Elk River, MN (US); Glenn Charles Wenig, Pleasanton, CA (US); Suresh Vobbilisetty, San Jose, CA (US); Phanidhar Koganti, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 858 days.

(21) Appl. No.: 13/097,876

(22) Filed: Apr. 29, 2011

(65) Prior Publication Data

US 2012/0106957 A1    May 3, 2012

Related U.S. Application Data

(60) Provisional application No. 61/333,610, filed on May 11, 2010.

(51) Int. Cl.
*H04L 12/28* (2006.01)
*H04L 29/12* (2006.01)

(52) U.S. Cl.
CPC .... *H04L 29/12207* (2013.01); *H04L 29/12886* (2013.01); *H04L 61/20* (2013.01); *H04L 61/6045* (2013.01)

(58) Field of Classification Search
CPC .................................................. H04L 49/357
See application file for complete search history.

(56) References Cited

U.S. PATENT DOCUMENTS

| 8,243,746 | B2* | 8/2012 | Di Benedetto | 370/419 |
|---|---|---|---|---|
| 8,422,359 | B2* | 4/2013 | Nakajima | 370/217 |
| 8,446,817 | B2* | 5/2013 | Stine et al. | 370/217 |
| 8,619,796 | B2* | 12/2013 | Armstrong et al. | 370/401 |
| 8,767,751 | B2* | 7/2014 | Dhar et al. | 370/401 |
| 8,848,575 | B2* | 9/2014 | Vobbilisetty | 370/254 |
| 2006/0251067 | A1* | 11/2006 | DeSanti et al. | 370/389 |
| 2009/0245242 | A1* | 10/2009 | Carlson et al. | 370/386 |
| 2009/0245791 | A1* | 10/2009 | Thaler et al. | 398/45 |
| 2010/0232419 | A1* | 9/2010 | Rivers | 370/352 |

(Continued)

OTHER PUBLICATIONS

John Hufferd, "T11/10-131v1—The FDF (FC/FCoE Data Forwarder", Apr. 3, 2010, p. 1-21, T11.org.

(Continued)

*Primary Examiner* — Phirin Sam
(74) *Attorney, Agent, or Firm* — Blank Rome, LLP

(57) ABSTRACT

The entire FCoE fabric is a single virtual domain, even though there may be multiple FCFs and FDFs. The virtual domain is a different Domain_ID than any of the FCFs. In certain embodiments there are multiple FCFs, of which one is selected as the master or designated FCF. The master FCF performs normal fabric configuration in conjunction with the Fiber Channel fabric. The master FCF assigns the virtual domain FC node IDs and controls development of subdomain IDs. Virtual links are instantiated between the master FCF and other FCFs, between top level FDFs and the FCFs and between the FDFs at each of various levels. FDFs connected to ENodes proxy the master FCF for most FIP operations. FIP FLOGI and FDISC operations are handled by the master FDF, but the FDFs convert the FIP FLOGI requests to VD_FLOGI requests, which include information about the FDF handling the transaction.

22 Claims, 32 Drawing Sheets

(56) References Cited

U.S. PATENT DOCUMENTS

| | | | |
|---|---|---|---|
| 2011/0044344 A1* | 2/2011 | Hudson et al. | 370/395.53 |
| 2011/0051733 A1* | 3/2011 | Hirata | 370/400 |
| 2011/0182294 A1* | 7/2011 | Lee et al. | 370/394 |
| 2012/0039163 A1* | 2/2012 | Nakajima | 370/217 |
| 2013/0223281 A1* | 8/2013 | Pandit | 370/254 |

OTHER PUBLICATIONS

Brocade, "T11/10-233v1—FC-BB-6: Single Domain FCoE Fabrics", Jun. 9, 2010, p. 1-18, T11.org.

Claudio Desanti, "T11/10-271v0—VA_Ports: FDF/Controlling FCF Protocols", Jun. 8, 2010, p. 1-45, T11.org.

Claudio Desanti, "T11/10-271v1—VA_Ports: FDF/Controlling FCF Protocols", Jun. 10, 2010, p. 1-45, T11.org.

Claudio Desanti, "T11/10-271v2—VA_Ports: FDF/Controlling FCF Protocols", Aug. 4, 2010, p. 1-59, T11.org.

Claudio Desanti, "T11/10-271v3—VA_Ports: FDF/Controlling FCF Protocols", Oct. 20, 2010, p. 1-35, T11.org.

Claudio Desanti, "T11/10-271v4—VA_Ports: FDF/Controlling FCF Protocols", Dec. 8, 2010, p. 1-38, T11.org.

Roger Hathorn, Barry Maskas, Erik Smith, "T11/10-343v0—FC-BB-6 FDF Requirements", Jul. 29, 2010, p. 1-24, T11.org.

Brocade, "T11/10-345v0—FC-BB-6 Virtual Domain", Aug. 4, 2010, p. 1-16, T11.org.

Brocade, "T11/10-345v1—FC-BB-6 Virtual Domain", Oct. 19, 2010, p. 1-40, T11.org.

Brocade, "T11/10-345v2—FC-BB-6 Virtual Domain", Dec. 8, 2010, p. 1-40, T11.org.

Silvano Gai, "T11/10-346v0—FC-BB-6: FDF Features", Aug. 3, 2010, p. 1-14, T11.org.

Claudio Desanti, "T11/10-456v0—FDF Routing", Oct. 20, 2010, p. 1-34, T11.org.

Claudio Desanti, "T11/10-555v0—Cascading FDFs", Dec. 8, 2010, p. 1-53, T11.org.

Claudio Desanti, "T11/11-026v0—Distributed FCF", Feb. 8, 2011, p. 1-25, T11.org.

Claudio Desanti, "T11/11-026v1—Distributed FCF", Apr. 1, 2011, p. 1-38, T11.org.

Claudio Desanti, "T11/11-070v0—Distributed FCF—Presentation", Feb. 9, 2011, p. 1-26, T11.org.

Claudio Desanti, "T11/11-070v1—Distributed FCF—Presentation", Apr. 6, 2011, p. 1-30, T11.org.

Endl Texas, "T11/11-073v1—FC-BB-6 What is in the box?", Apr. 6, 2011, p. 1-2, T11.org.

T11.org, "Fibre Channel Backbone—FC-BB-5 Rev. 2.0", Jun. 4, 2009, p. begin to 27 and 81-165, T11.org.

T11.org, "Fibre Channel Switch Fabric—5 FC-SW-5 Rev. 8.0", Nov. 22, 2006, p. begin to 306, T11.org.

Endl Texas, "T11/11-073v0—FC-BB-6 What is in the box?", Feb. 9, 2011, p. 1-2, T11.org.

Brocade, "T11/1-233v0—FC-BB-6: Single Domain FCoE Fabrics", Jun. 6, 2010, p. 1-18, T11.org.

* cited by examiner

SINGLE VIRTUAL DOMAIN FIBRE CHANNEL OVER ETHERNET FABRIC

CROSS REFERENCE TO RELATED APPLICATIONS

This application claims the benefit under 35 U.S.C. §119 (e) of U.S. Provisional Patent Application Ser. No. 61/333,610, entitled "Single Domain FCoE Fabrics," filed May 11, 2010, which is hereby incorporated by reference.

BACKGROUND OF THE INVENTION

1. Field of the Invention

The invention relates to networking fabrics, and more particularly to Fibre Channel over Ethernet fabrics.

2. Description of the Related Art

Fibre Channel over Ethernet (FCoE) is a developing standard to enable Fibre Channel operations over an Ethernet network. Many uses of an FCoE fabric will be to connect to existing Fibre Channel fabrics. The interface between the Fibre Channel over Ethernet fabric and the Fibre Channel fabric is a device called the FCoE Forwarder (FCF).

One restriction of Fibre Channel is a 239 Domain_ID limitation. In conventional Fibre Channel operation each switch consumes a Domain_ID. Many of the perceived implementations of FCoE networks have each FCF assigned a unique Domain_ID. The concern is that the sheer number of these devices when installed both top of rack (TOR) and end of row (EOR) will result in Domain_ID exhaustion. This Domain_ID exhaustion could create difficulties in both the existing Fibre Channel fabric and in the FCoE fabric. Therefore a solution to the potential large number of Domain_IDs in an FCoE environment is desirable.

One proposed solution was the creation of switches in the FCoE fabric that have capabilities beyond that of a simple Ethernet switch. These switches are called FCoE data forwarders (FDF). The proposed solution had FDFs connecting between the nodes, referred to as ENodes in FCoE, and an FCF. The ENodes would be connected to FDFs, which in turn connected to an FCF. The proposed solution had the FCoE fabric that resulted being a part of the domain of the FCF. While this did address the Domain_ID exhaustion issue, it resulted in other issues relating to failover, multipathing and the like. A solution that alleviates Domain_ID exhaustion while also providing failover, multipathing, and other characteristics common in an FC SAN is desired.

SUMMARY OF THE INVENTION

In embodiments, according to the present invention, the entire FCoE fabric is a single virtual domain, even though there may be multiple FCFs and FDFs. The virtual domain has a different Domain_ID than any of the FCFs used to connect the FCoE fabric to the FC SAN. In some of the embodiments node port IDs are not based on the particular FDFs or FCFs which they connect through. In other embodiments, subdomains exist inside the FCoE fabric, with address partitioning performed as desired at the FCF and FDF level. In these embodiments each FCF and FDF is assigned a virtual domain unique subdomain ID (SDID).

In certain embodiments there are multiple FCFs. One of the FCFs is selected as the master or designated FCF, with the remainder being the FCFs slaves. This allows for active-active configurations for failover and multipathing. The FCF(s) perform normal fabric configuration in conjunction with the Fibre Channel fabric. The master FCF assigns the virtual domain FC node IDs and controls development of the subdomain IDs.

Virtual links are instantiated between the master FCF and the slave FCFs. Virtual links are also instantiated between top level FDFs and the FCFs. Virtual links are instantiated between the FDFs at each of various levels, such as top level and second level.

The ENodes are connected to FDFs or to FCFs. The FDFs effectively proxy the master or designated FCF for most FIP (FCoE Initialization Protocol) operations. However, FIP FLOGI and FDISC operations are handled by the master FCF for FDF connected ENodes, where the FDFs convert the FIP FLOGI or FDISC requests to VD_FLOGI or VD_FDISC requests, which include information about the FDF handling the transaction. This allows simple development of the routing tables by the master FCF.

Routing in the single virtual domain FCoE fabric is performed using either the FSPF protocol conventionally used in Fibre Channel, in which case it is done by the FCFs and FDFs individually, or a combination of FSPF for the FC portions and adjacency information based on FDF connections, in which case the master FCF performs the routing analysis and provides it to the other FCFs and the FDFs. In either of the embodiments, the routing can be performed directly between the ENodes through the FDFs, without requiring traversing up to the FCF and then back down.

DETAILED DESCRIPTION

Figure 1:
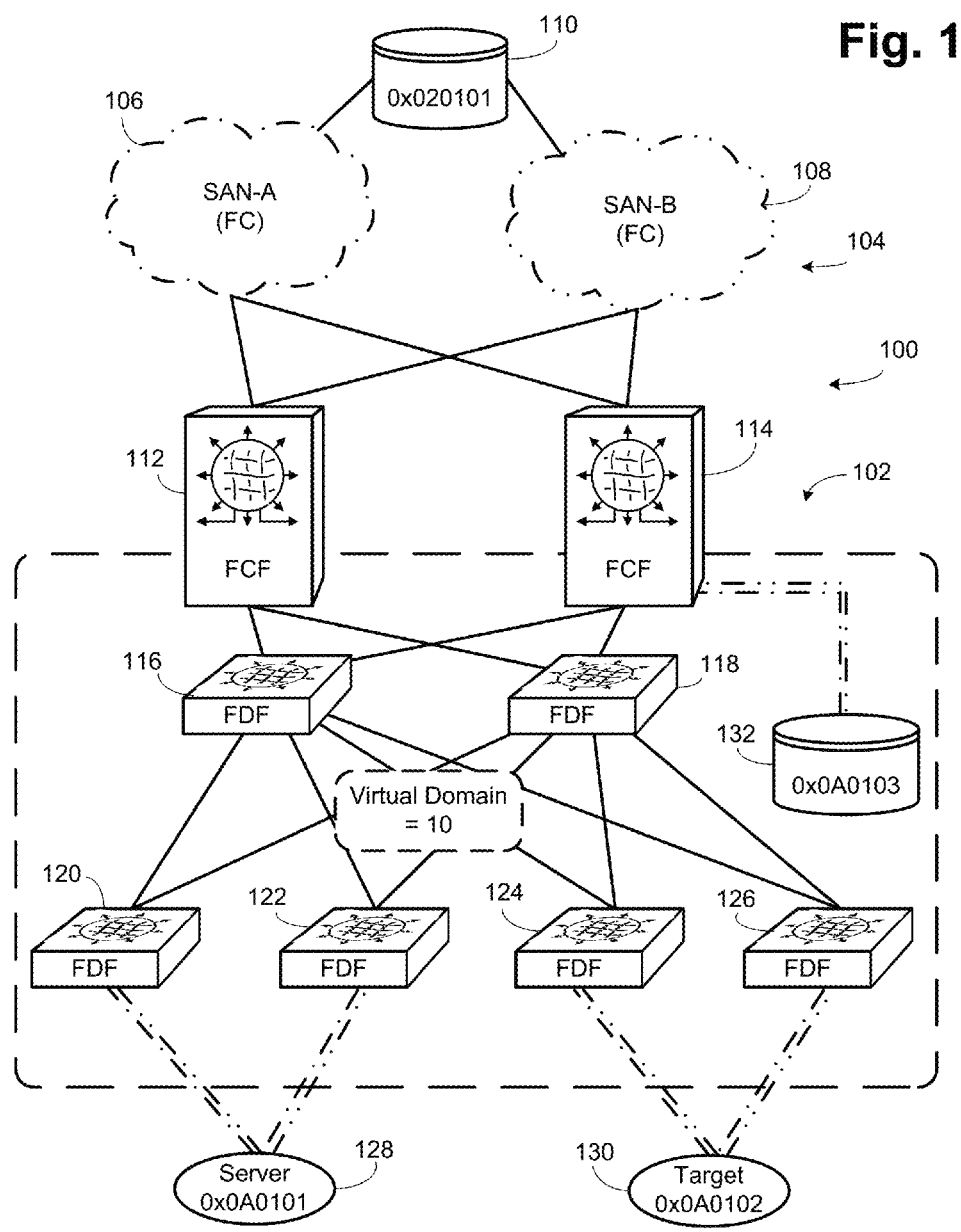
FIG. 1 is a block diagram of a storage network including Fibre Channel and Fibre Channel over Ethernet fabrics according to the present invention.

Referring to FIG. 1, a network 100 according to the present invention is illustrated. The network 100 includes a Fibre Channel over Ethernet (FCoE) network portion 102 and a Fibre Channel (FC) network portion 104. The Fibre Channel network portion 104 includes a fabric SAN-A 106 and a fabric SAN-B 108. An exemplary storage unit 110 is connected to both fabrics 106 and 108 in normal Fibre Channel redundant operation. Connected to the fabrics 106 and 108 are FCoE forwarders (FCFs) 112 and 114. These two FCFs form the interface between the FCoE network portion 102 and the Fibre Channel network portion 104. Connected to each of the FCFs 112, 114 are two FCoE data forwarders (FDFs) 116 and 118. Connected to each of the FDFs 116 and 118 are FDFs 120, 122, 124 and 126. An exemplary server 128 is connected to FDFs 120 and 122. An exemplary target 130 is connected to FDFs 124 and 126. An exemplary storage unit 132 is connected to the FCF 114.

The FCoE network portion 102 is treated as a single virtual domain with a Domain_ID value of 10 decimal or A hexadecimal in the illustrated embodiment. This can be seen in the addresses of the server 128, target 130 and storage unit 132, where the Domain_ID addresses in typical Fibre Channel format are all 0Axxxx. It is noted that the ENode addresses in the illustrated embodiment are not assigned in any particular order, with the area the same and the AL_PA values simply consecutive.

Figure 2:
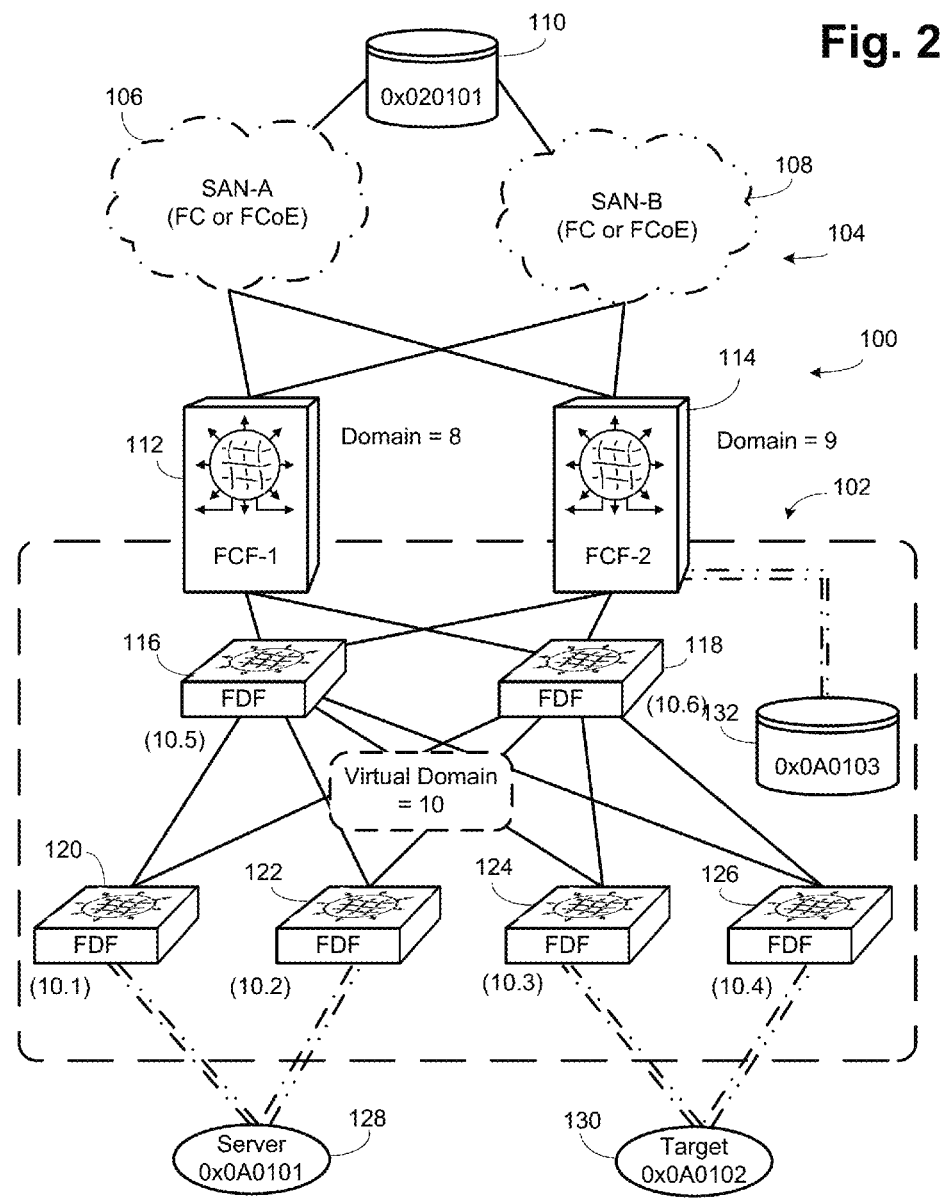
FIG. 2 provides exemplary addresses and Domain_ID information for the storage network of FIG. 1.

FIG. 2 provides additional Domain_ID and address information for an embodiment where the FDFs do not receive FC IDs. The Domain_ID of the FCF 112 is 8, while the Domain_ID of the FCF 114 is 9. Thus the virtual Domain_ID is different from either of the FCFs 112 or 114. This allows for failover and load balancing without requiring fabric reconfiguration. Each of the FDFs 116-126 includes an internal subdomain address in the format 10.x. For example, FDF 120 has an address for internal routing purposes of 10.1, FDF 122 has an address of 10.2, FDF 124 has an address of 10.3 and so on. These are internal addresses and are used for routing purposes inside the FCoE network portion 102 and are not actual addresses per se granted to the FDFs. In one embodiment, routing in the FCoE network portion 102 is done using the FSPF protocol of FC. By providing the FDFs with internal subdomain IDs, the FSPF algorithm can directly operate with the values for the ENodes, the FDFs and the FCFs. While the actual connections between ENodes and FDFs, between FDFs and between FDFs and FCFs may include non-FCoE aware Ethernet switches and thus not operate according to FSPF, the use of FSPF with the ENodes, FDFs and FCFs provides some level of routing control and routing tables can be developed by each FCF and FDF independently. In another embodiment routing inside the FCoE network portion 102 is not done using FSPF but rather adjacencies between the FDFs with an FCF developing the routing tables and providing the information to the FDFs.

Figure 3:
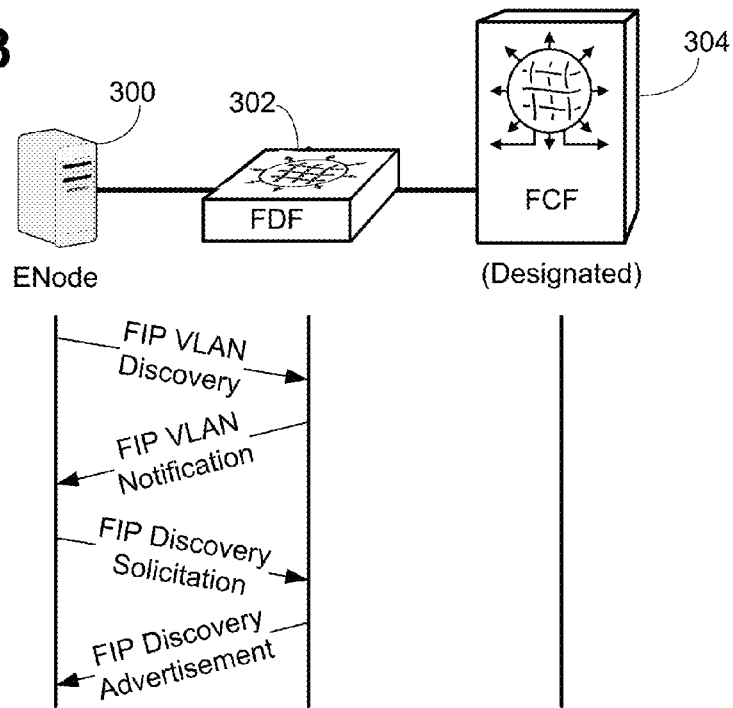
FIGS. 3 to 7 are ladder diagrams illustrating various phases of operation of an FCoE fabric according to the present invention.
Figure 4:
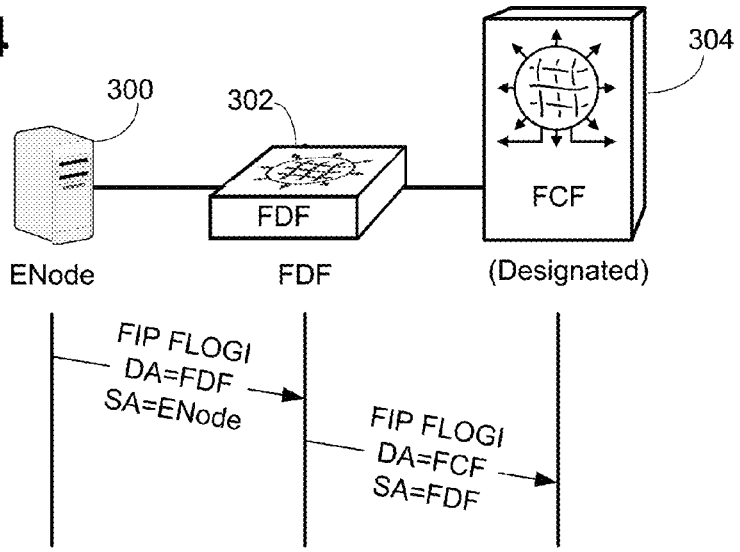
Figure 5:
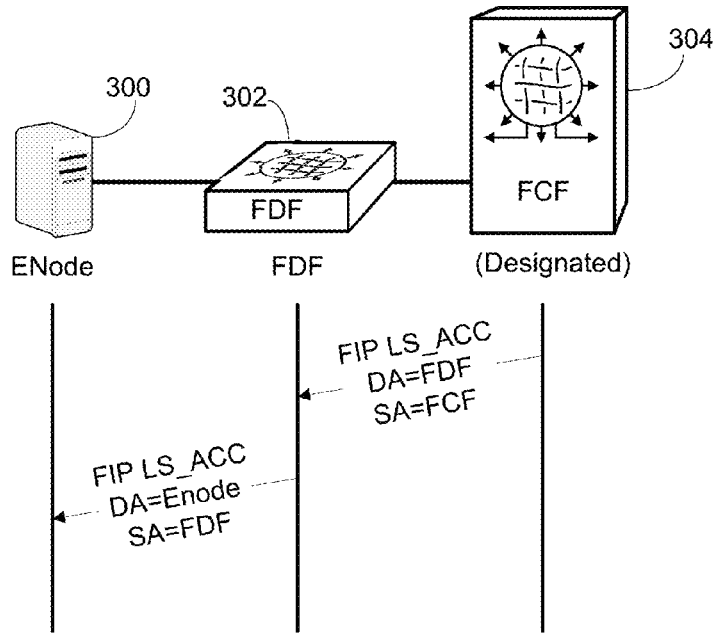

FIGS. 3 to 5 illustrate ENode discovery. In FIG. 3, an ENode 300 is connected to an FDF 302, which is in turn connected to an FCF 304. The FCF 304 is illustrated as a designated or master FCF responsible for providing addresses for the virtual domain and thus acting as the principal switch for the virtual domain. The ENode 300 provides a FIP VLAN discovery packet to the FDF 302, which replies with a FIP VLAN notification to provide the VLAN for operation. The ENode 300 provides a FIP discovery solicitation according to the standard FCoE protocol as defined in FC-BB-5, hereby incorporated by reference. The FDF 302 responds as an FCF in the standards document, thus offloading or proxying some FCF operations. The FDF 302 provides a FIP discovery advertisement to the ENode 300, which provides the address of the FDF 302 to the ENode 300 as the address for FIP FLOGI requests. In the embodiment of FIG. 4 the ENode 300 provides a FIP FLOGI to the FDF 302. The destination address of the Ethernet frame is the FDF 302, while the source addresses is the ENode 300. The FDF 302 forwards this frame to the FCF 304, with the Ethernet addresses changed to have a destination address of the FCF 304 and source address of the FDF 302. In FIG. 5, the FCF 304 replies with an Accept or LS_ACC, with an Ethernet destination address of the FDF 302 and a source address of the FCF 304. The FIP accept includes the MAC address of the FCF 304 as well as the Fibre Channel node ID or address. The FDF 302 forwards this FIP acceptance to the ENode 300, changing the Ethernet addresses to have a destination of the ENode 300 and a source of the FDF 302.

Figure 6:
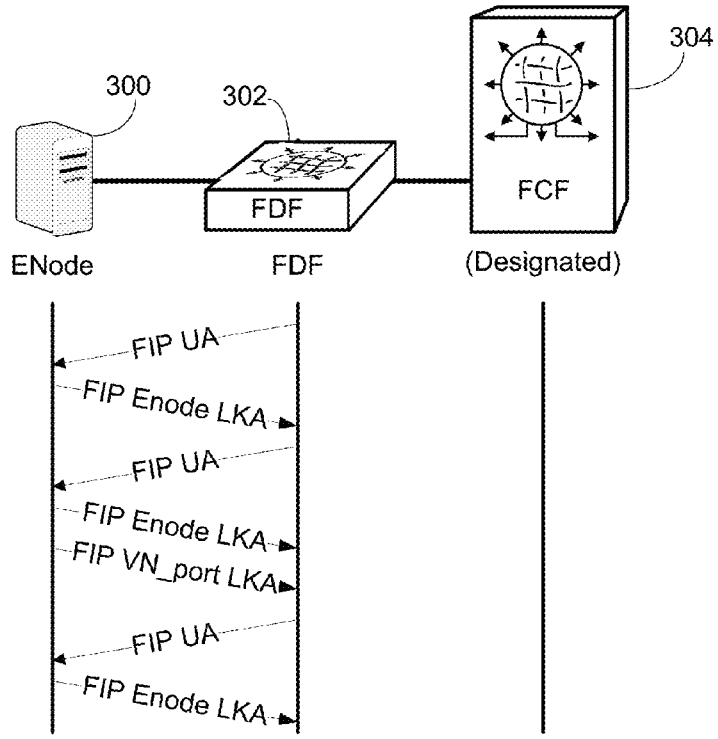

FIG. 6 illustrates virtual link maintenance. The FDF 302 periodically provides a FIP unsolicited advertisement (UA) to the ENode 300. The ENode 300 replies with an ENode FIP link keep alive (LKA). In certain cases the ENode 300 also replies with VN_Port link keep alive.

Figure 7:
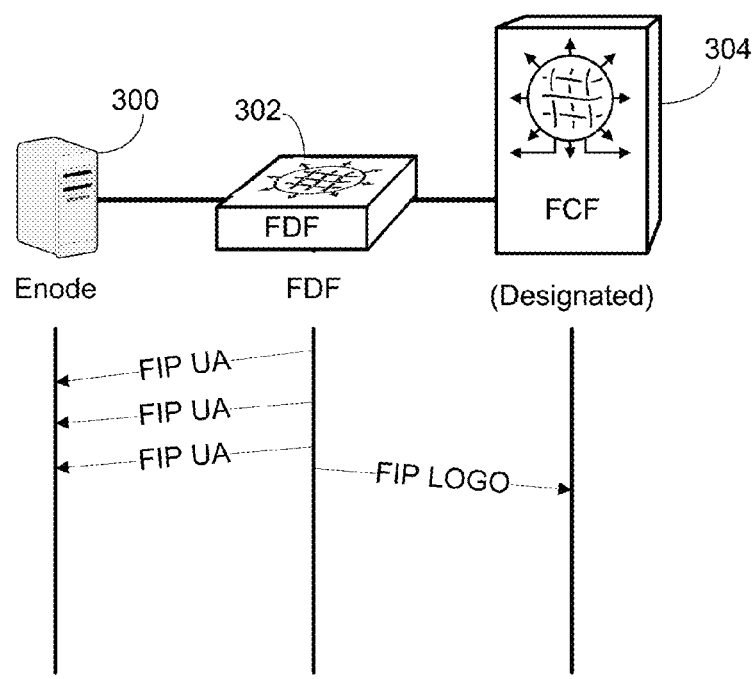

FIG. 7 illustrates the case where the FIP UAs are unacknowledged. The FDF 302 provides a series of unacknowledged FIP unsolicited advertisements. After a timeout occurs, the FDF 302 provides a FIP LOGO or logout operation to the FCF 304 on behalf of the ENode 300.

The master or designated FCF 304 maintains a name server for the virtual domain. This name server includes a database that is similar to conventional Fibre Channel name server databases as the FCF 304 is acting as a principal switch. The name server will distribute device information and will register and distribute local device information. It will maintain fabric wide consistency by the use of RSCNs and conventional name server queries. It will notify local devices of changes by the use of RSCNs. It will also facilitate zoning by feeding information regarding the FCoE ENode devices to the Fibre Channel fabric portion of the network.

As noted above, in this embodiment the FDFs are given internal addresses, such as 10.1, 10.2. These are utilized by the FCF and the FDFs for internal routing operations, preferably using the FSPF protocol, inside the virtual domain. This routing is done, as explained more below, by changing the Ethernet addresses of the FCoE packets or frames at each FDF to conform to the desired routing. To facilitate this routing operation, additional name server objects are included in the name server database which indicate the FDF behind which a particular ENode port or Fibre Channel address resides. For example, server 128 has an FC address of 0A0101 and resides behind FDF 120, which has an internal address of 10.1. This information is an entry maintained inside the new server database. An additional entry would be the connection of the FDF 116 being in front of the FDF 120. In another embodiment the FCF will use these entries to develop the routing table and simply provide that to the FCFs and FDFs, rather than using FSPF at each device.

Figure 8:
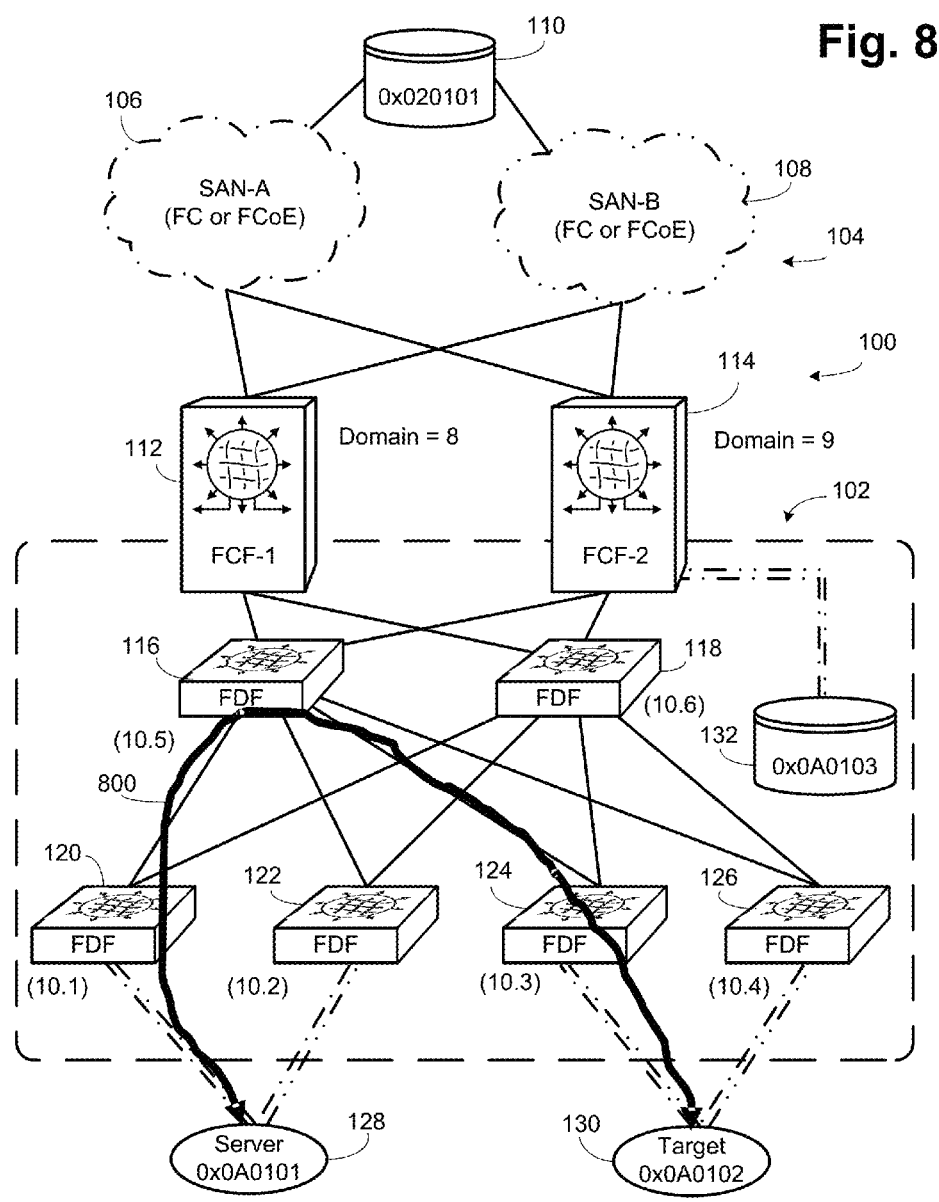
FIG. 8 illustrates a peer-to-peer FCoE operation of the FCoE fabric of FIG. 1.

FIG. 8 illustrates peer-to-peer routing according to one embodiment. The server 128 is communicating with the target 130. The server 128 provides a first packet to the FDF 120. The Fibre Channel addresses are those of the server 128 and the target 130, while the Ethernet addresses are those of the FDF 120 and the server 128. The FDF 120 translates the Ethernet addresses in the packet to be a destination of the FDF 116 and a source of the FDF 120. The FDF 116 translates the Ethernet addresses to the destination of the FDF 124 and source of the FDF 116. The FDF 124 translations the Ethernet addresses to be a destination of the target 130 and a source of the FDF 124. In this manner packets from the server 128 to the target 130 traveled the path 800 through FDF 120, FDF 116 and FDF 124. This routing occurs even if there are intervening non-FCoE aware Ethernet switches and is quite likely different from the conventional spanning tree route between the devices. Spanning tree routing would only be used between the server 128 and the FDF 120, between the FDFs and between the FDF 124 and the target 130. This occurs because the FDFs route FCoE traffic according to the FC addresses, not the MAC addresses, and the MAC addresses are changed at each FDF.

Figure 9:
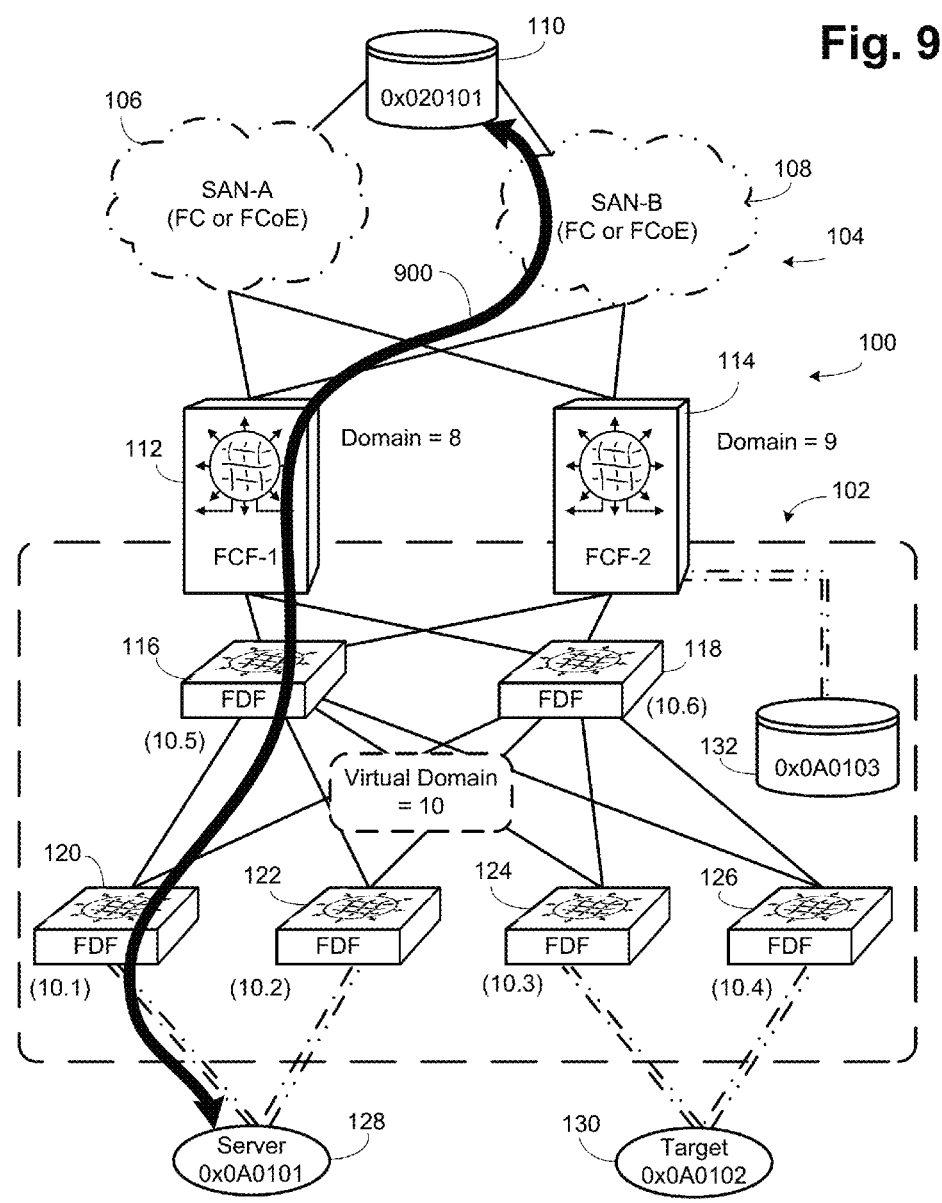
FIG. 9 illustrates FCoE ENode to Fibre Channel node operation of the network of FIG. 1.

FIG. 9 illustrates routing from the server 128 to the storage unit 110. In this case the FC addresses in packet are addressed with the source address of 0A0101 and the destination address of 020101, from the server 128 to the storage unit no. The Ethernet addresses of the packet provided from the server 128 are to the FDF 120 and from the server 128. As above, the frame is translated by the FDF 120 to be to the FDF 116 and from the FDF 120. The FDF 116 then changes the Ethernet addresses to be a destination of the FCF 112 and a source of the FDF 116. The FCF 112 performs the Fibre Channel over Ethernet to Fibre Channel translation by stripping the Ethernet portions and then provides the frame to fabric 108, which delivers the frame to the storage unit 110.

Figure 10:
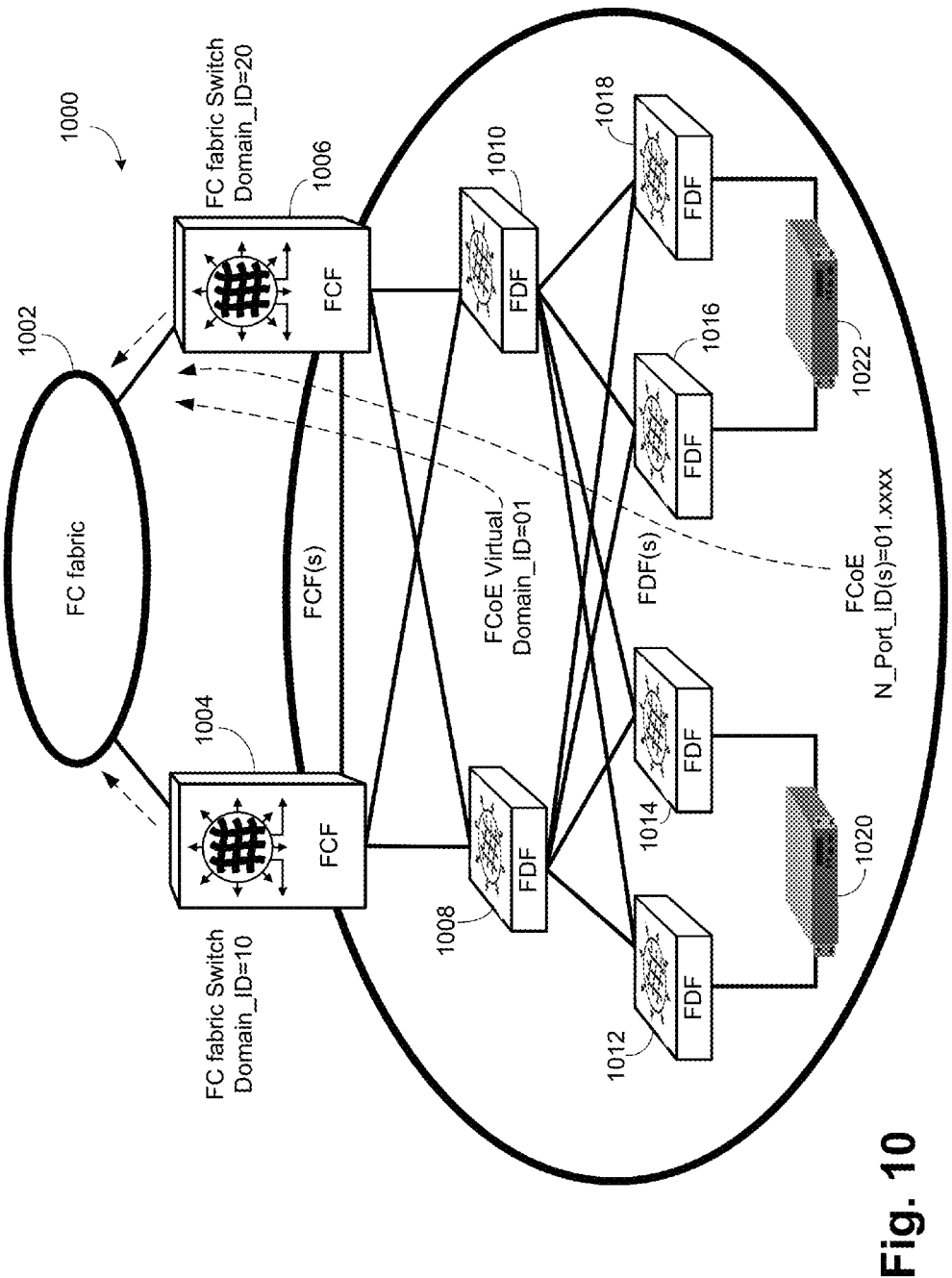
FIG. 10 is a block diagram of a storage network including an FC fabric and an FCoE fabric according to the present invention.

FIG. 10 is an alternate embodiment of a network according to the present invention. A Fibre Channel fabric 1002 is connected to two FCFs 1004 and 1006. The FCFs are interconnected. Each of the FCFs 1004 and 1006 are connected to two top layer FDFs 1008 and 1010. The FDFs 1008 and 1010 are connected to four second layer FDFs, 1012, 1014, 1016 and 1018. A first server 1020 is connected to the FDFs 1012 and 1014, while a second server 1022 is connected to the FDFs 1016 and 1018. In the illustrated embodiment the virtual FCoE domain has Domain_ID of 1, the FCF 1004 has a Domain_ID of 10, and the FCF 1006 has a Domain ID of 20. The virtual FCoE Domain_ID of 1 results in the addresses of the FC VN_Ports being 01xxxx.

Figure 11:
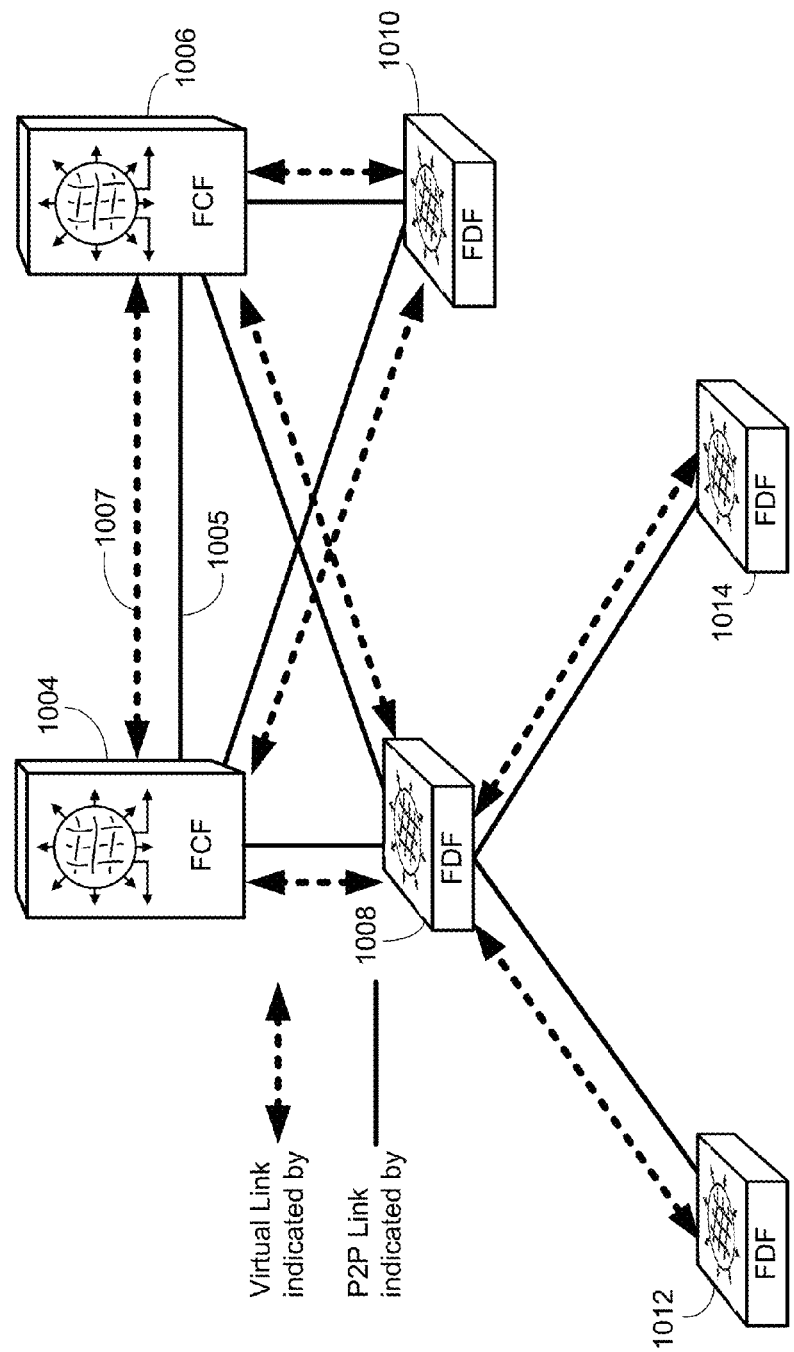
FIG. 11 is a portion of the FCoE fabric portion of the network of FIG. 10 illustrating the FCFs and the FDFs with the virtual and peer-to-peer links illustrated.
Figure 12:
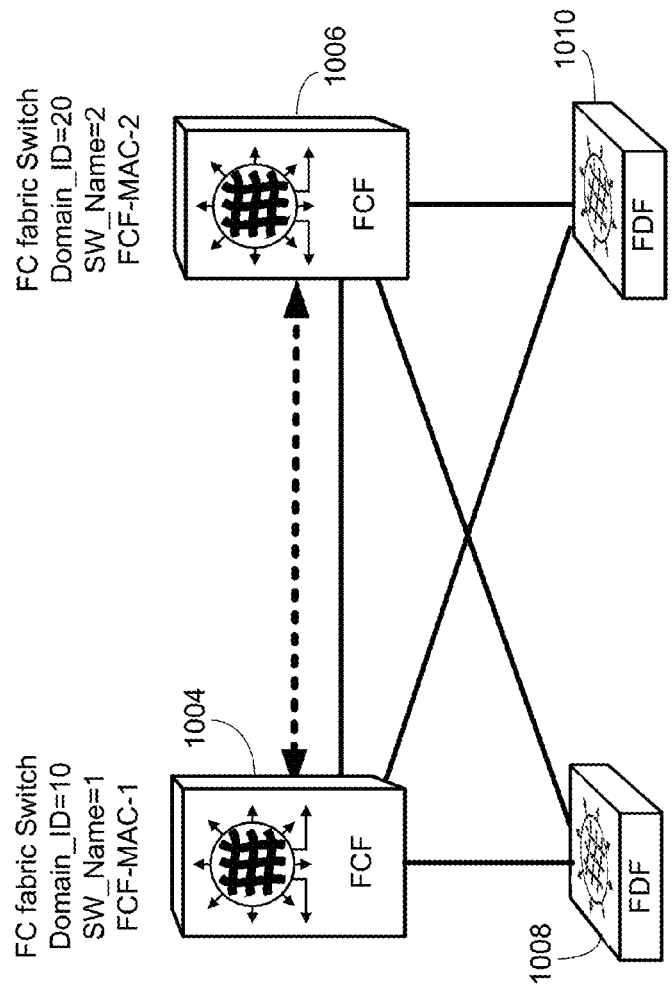
FIG. 12 is a portion of the block diagram of FIG. 11 illustrating the FCFs and top layer FDFs.

FIG. 11 illustrates the physical or peer-to-peer (P2P) links and virtual links of a portion of the network of FIG. 10. FCFs 1004, 1006 are interconnected by a physical link 1005 and a virtual link 1007. Each of the FCFs 1004, 1006 are connected to the FDFs 1008, 1010 with physical and virtual links. The FDF 1008 is connected to FDFs 1012, 1014 with physical and virtual links. FIG. 12 illustrates that the FCF 1004 has a Domain_ID of 10, a switch name of 1 and a MAC address of FCF-MAC-1. The FCF 1006 has a Domain_ID of 20, a name of 2 and a MAC address of FCF-MAC-2.

Figure 13:
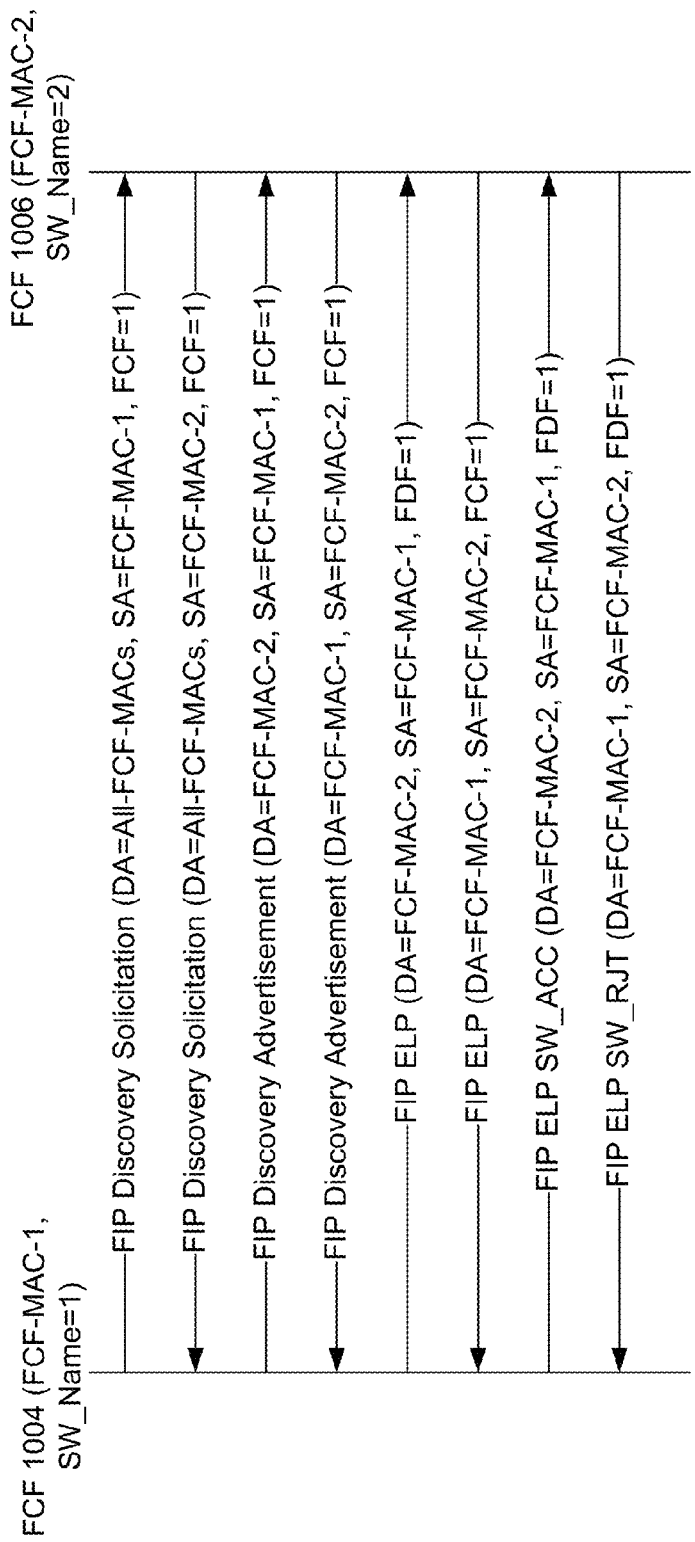
FIG. 13 is a ladder diagram of communications between the two FCFs of FIG. 12.

FIG. 13 illustrates the operations where the two FCFs 1004, 1006 discover each other and determine master and slave. FCF 1004 sends a FIP discovery solicitation to FCF 1006. FCF 1006 also sends a FIP discovery solicitation to FCF 1004. Both FCFs 1004, 1006 then return FIP discovery advertisements to the other. Following that, the two FCFs 1004, 1006 exchange FIP ELPs (Exchange Link Parameters) to determine the link parameters. In addition to referencing FC-BB-5 previously mentioned, reference to FC-SW-5, hereby incorporated by reference, is also helpful. In the illustrated case, the FCF 1006 has a higher switch name and therefore will become the master or designated FCF. Therefore the FCF 1004 returns an SW_ACC or accept message to the received ELP, while FCF 1006 returns a SW_RJT or reject to the ELP. Therefore, at the end of this handshaking, FCF 1006 is the designated or master FCF and FCF 1004 is a slave FCF.

Figure 14:
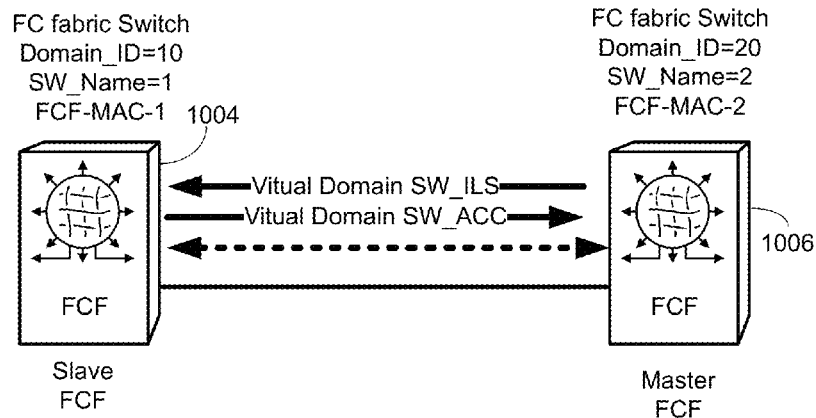
FIGS. 14 to 17 are block diagrams of the FCoE fabric of FIG. 12 illustrating various communications and addressing information.

The master FCF 1006 in one embodiment automatically assigns the virtual Domain_ID of 1 to virtual FCoE domain. In FIG. 14 the master FCF 1006 provides the domain information to the slave FCF 1004 using a virtual domain SW-ILS, which returns an acceptance to the master FCF 1006.

Figure 15:
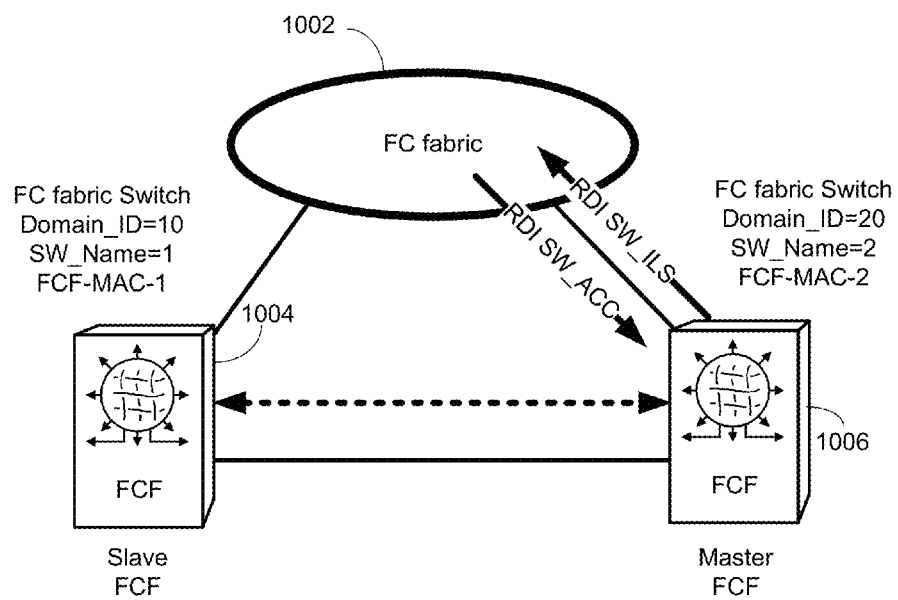
Figure 16:
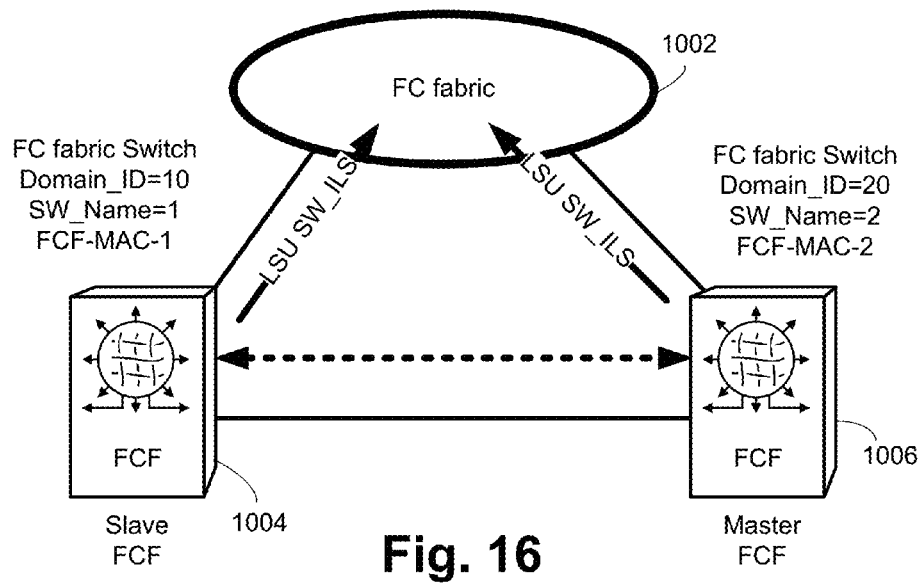

In FIG. 15 the master FCF 1006 performs a request Domain_ID operation (RDI) with the Fibre Channel fabric 1002. As the virtual Domain_ID of 01 is, in one embodiment, a default operation, the requested Domain_ID is provided and acknowledged by the FC fabric 1002 with an accept packet. Alternatively, the FC fabric 1002 could return a different Domain_ID, such as A as shown in earlier figures. In FIG. 16, both of the FCFs 1004, 1006 then provide link state updates to the Fibre Channel fabric 1002, as would be normal on FC operations.

Figure 17:
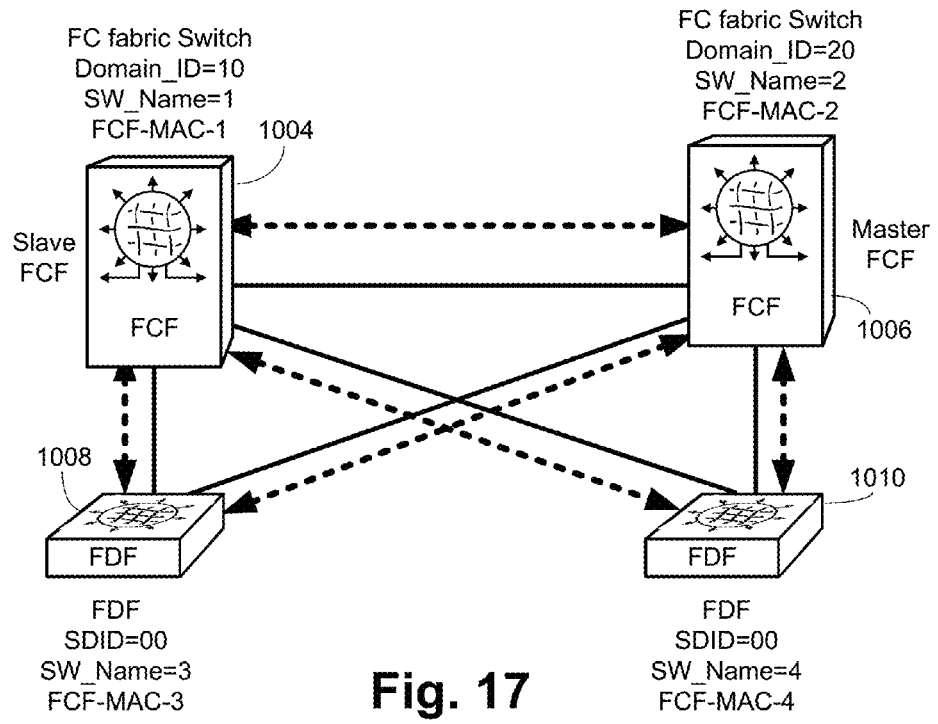

FIG. 17 illustrates the environment of configuration of the top layer FDFs 1008, 1010 after completion of the FCFs 1004, 1006. FDFs 1008 and 1010 are initially configured with subdomain IDs of (SDIDs) zero and switch names and MAC addresses.

Figure 18:
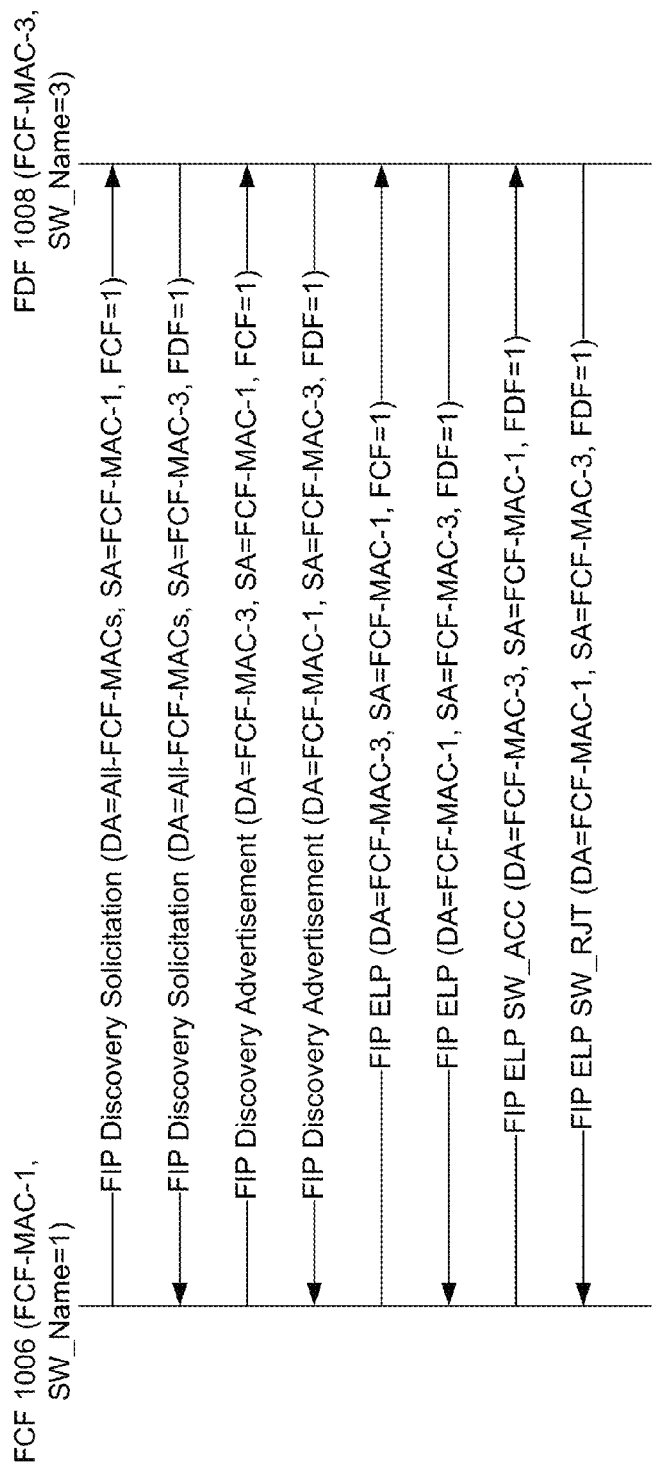
FIG. 18 is a ladder diagram of initial operations between an FCF and FDF of the FCoE fabric of FIG. 12.

FIG. 18 is the ladder diagram illustrating the initialization operations between the FCF 1006 and the FDF 1008. Both the FCF 1006 and the FDF 1008 exchange FIP discovery solicitations. Both return FIP discovery advertisements. It is noted that in each of these operations, an FCF or FDF bit is set appropriately to indicate that the source is either an FCF or FDF. This allows the two devices to determine their relative operations. After the exchange of FIP ELPs, the FCF 1004 accepts the ELP from the FDF 1006, while the FDF 1006 rejects the ELP from the FCF 1004, thus affirming the roles of the two devices and instantiating the virtual link. The FDF 1006, while an FDF responding to the master FCF, rejects the FCF ELP because the FDF 1008 has a higher switch name.

Figure 19:
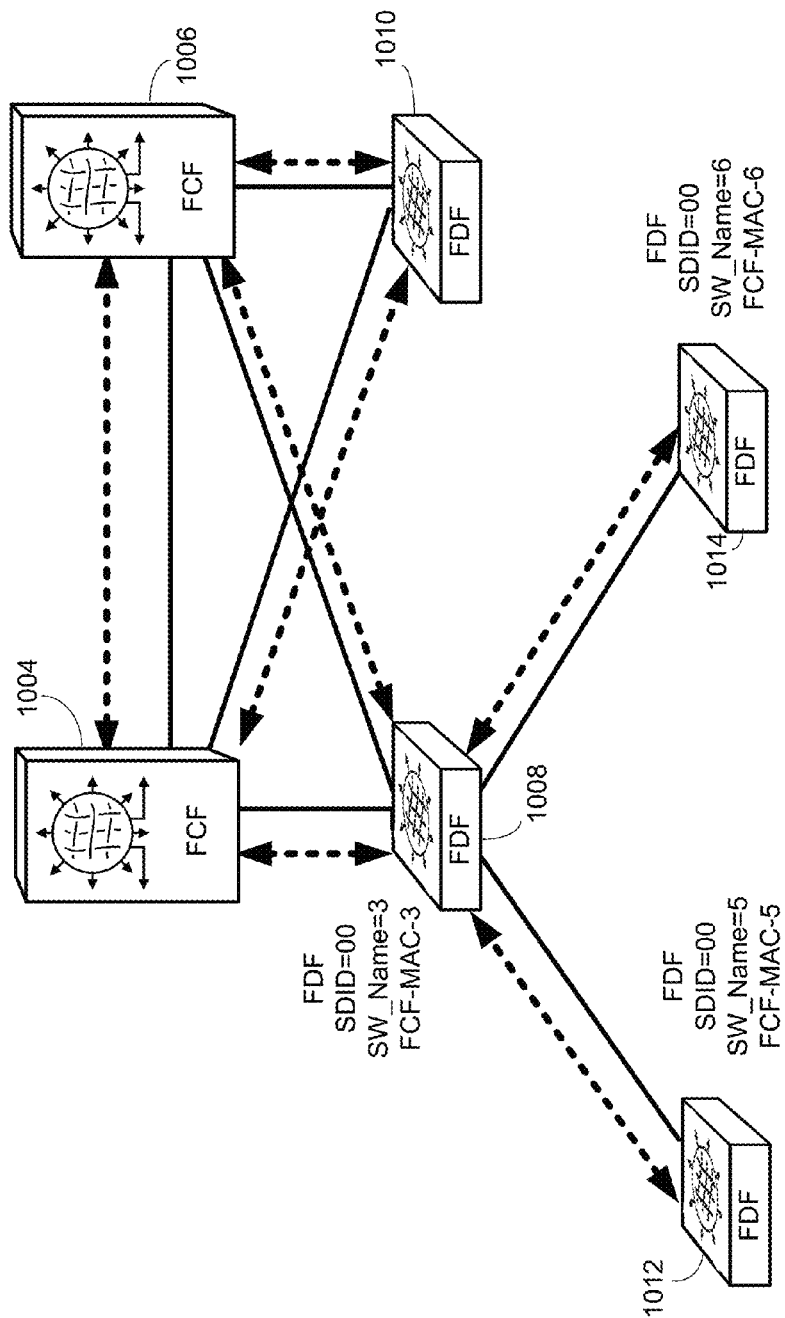
FIG. 19 is the block diagram of FIG. 11 illustrating the virtual links, peer-to-peer links and addressing of the top layer FDFs and a portion of second layer FDFs.
Figure 20:
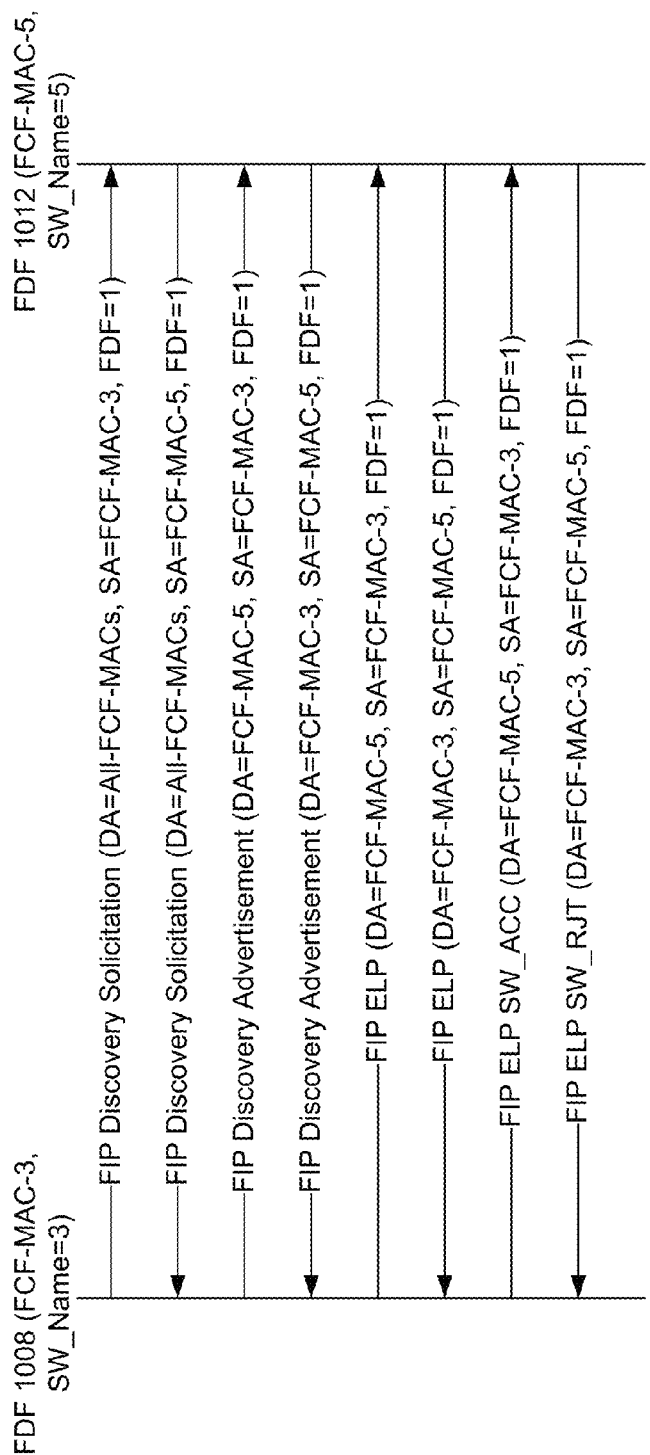
FIG. 20 is a ladder diagram of operations between a top level FDF of the fabric of FIG. 12 and the second level of FDFs according to the present invention.

FIG. 19 adds second layer FDFs 1012 and 1014 having SDIDs of zero, switch names of five and six respectively and MAC addresses. They are connected to FDF 1008. The operations for FDFs 1012 and 1014 are illustrated in FIG. 20. The operations are exchanges of FIP discovery solicitations, FIP discovery advertisements and FIP ELPs. At the end of the FIP ELP sequence, the FDF 1008 accepts the ELP from the FDF 1012 and the FDF 1012 rejects the ELP from the FDF 1008 based on the FDF 1012 having a higher switch name. With this completion, the virtual links between the various devices are instantiated and SDID assignment can commence.

Figure 21:
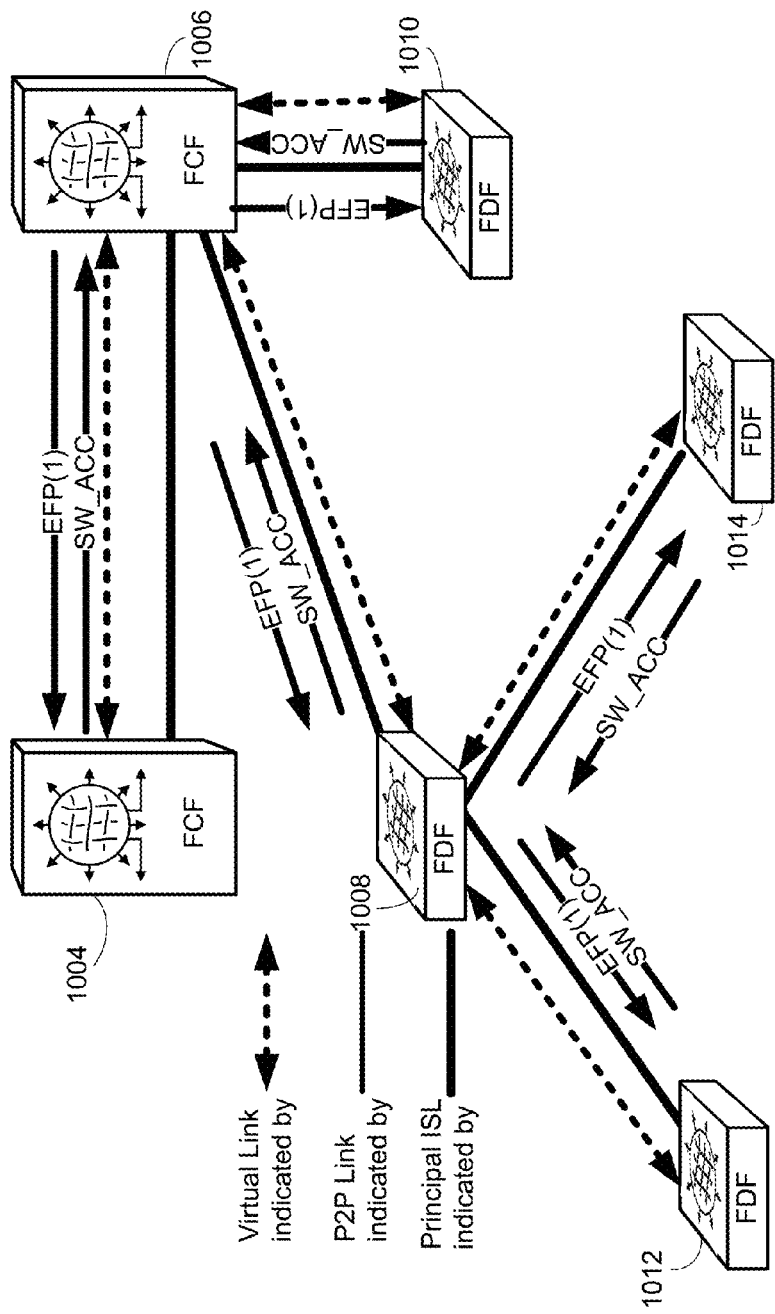
FIGS. 21 to 27 illustrate the various communications operations which occur in the fabric of FIG. 11 during configuration of the slave FCF and the FDFs.
Figure 22:
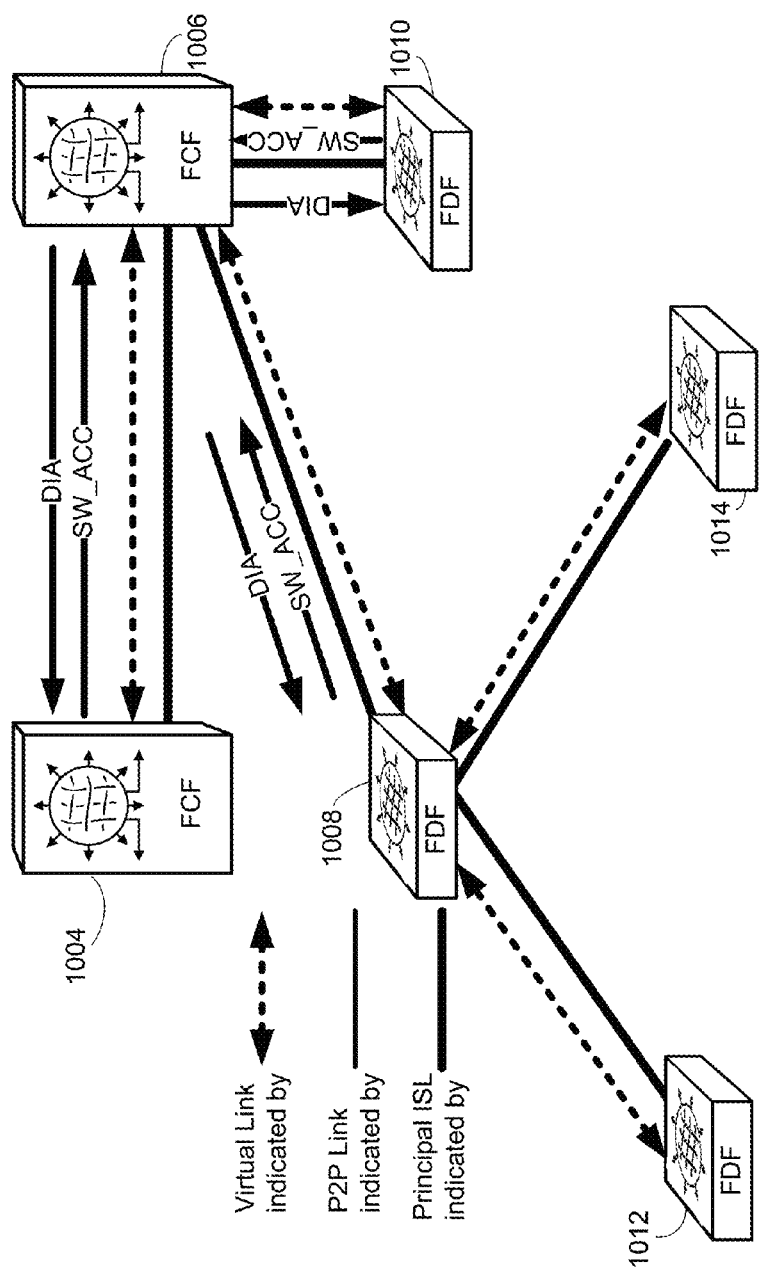
Figure 23:
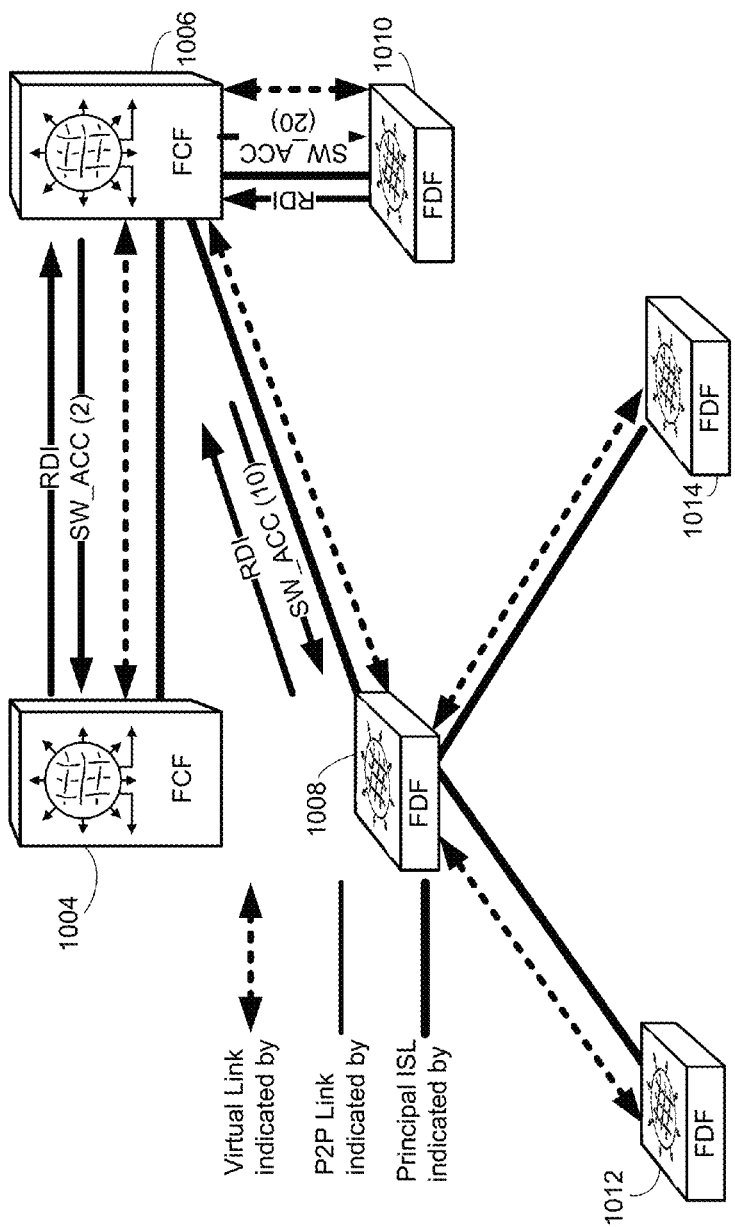

FIG. 21 is the initial phase of subdomain assignment. The master FCF 1006 assigns itself SDID of one and sends EFP (Exchange Fabric Parameters) packets to all other devices, that is the slave FCF 1004 and the FDFs 1008, 1012 and 1014. Each of the other devices replies with an accept packet. In FIG. 22 the master FCF 1006 sends a DIA (Domain Identifier Assigned) packet to the FCF 1004 and the FDFs 1008 and 1010. They reply with accept packets. In FIG. 23 the FCF 1004 and the FDFs 1008 and 1010 request Domain_IDs from the master FCF 1006. The master FCF 1006 replies to these requests for Domain_IDs with the SDIDs in the acceptance packet. In the example, FCF 1002 receives a SDID of 2, the FDF 1008 receives a SDID of 10 and FDF 1010 receives a SDID of 20.

Figure 24:
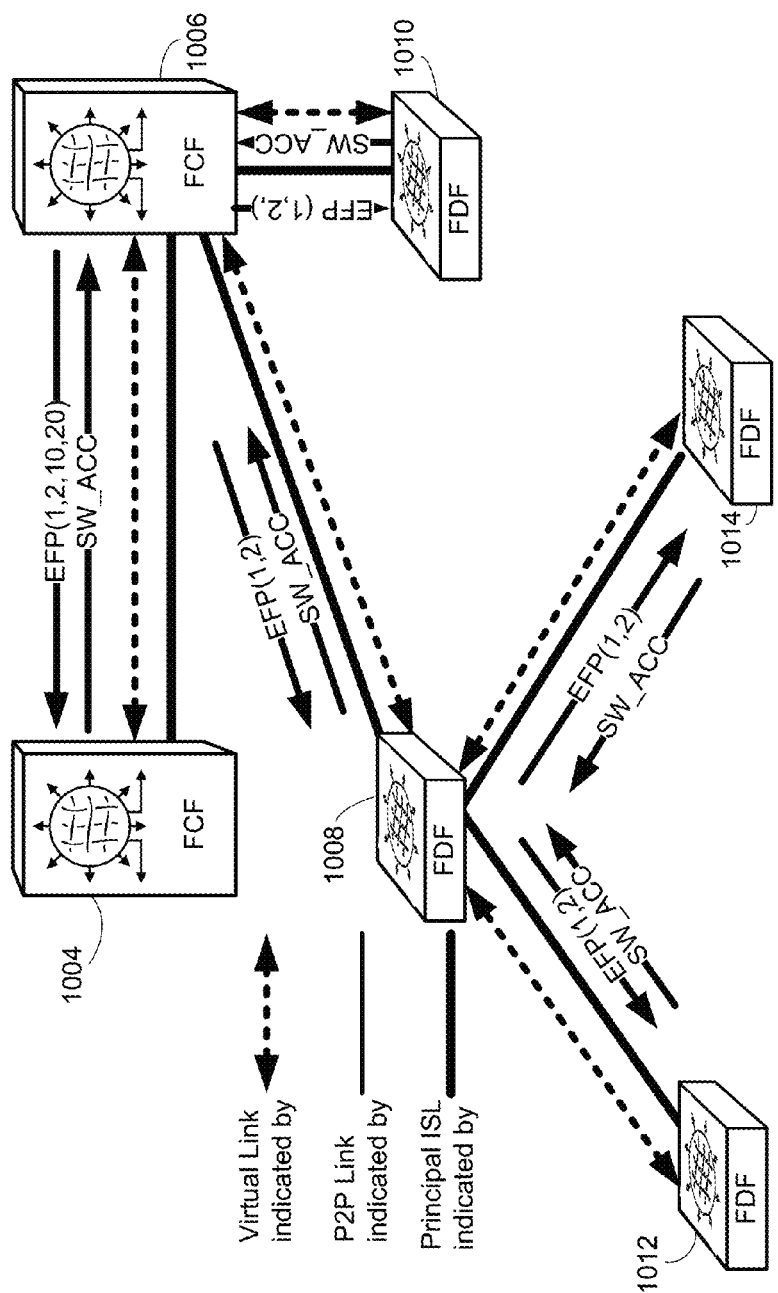

In some embodiments the SDIDs are prefix-based. The usable address range is 16 bits, as the Domain_ID is fixed. Preferably one mask bit is added for each level below the FCFs, with all FDFs having at least an 8 bit mask. In FIG. 24 the master FCF 1006 sends EFP updates to all of the FCFs and FDFs so that they are updated as to the fabric information of the FCF 1006. The FCF 1004 receives four EFP updates, one for each update when a subdomain is assigned. The FDFs 1008, 1010, 1012 and 1014 receive updates for subdomain assignments of the FCFs only. The devices reply with acceptances.

Figure 25:
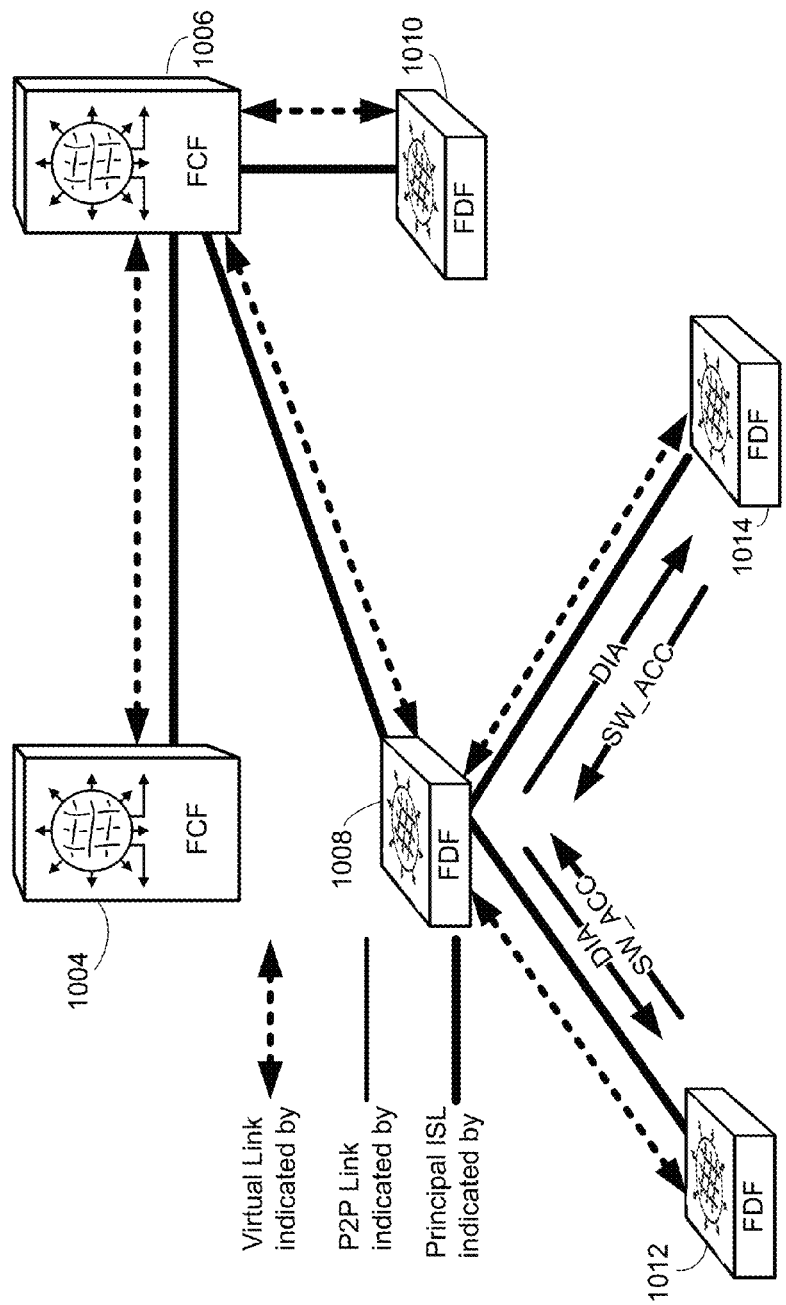
Figure 26:
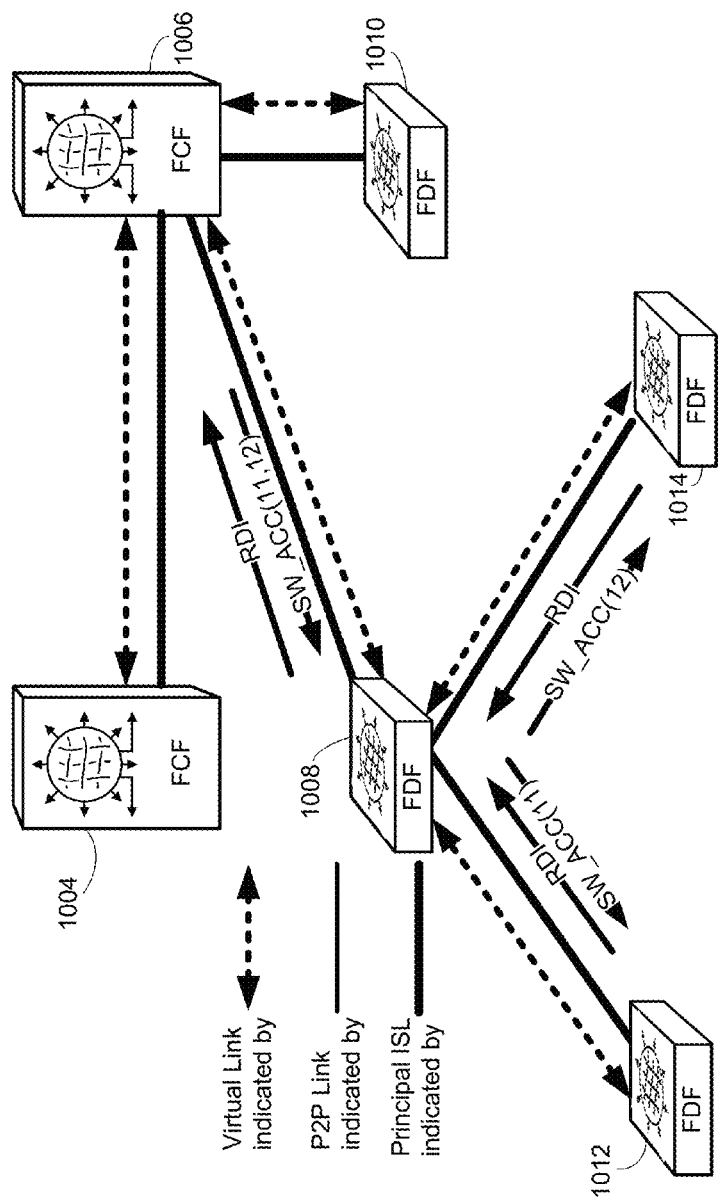
Figure 27:
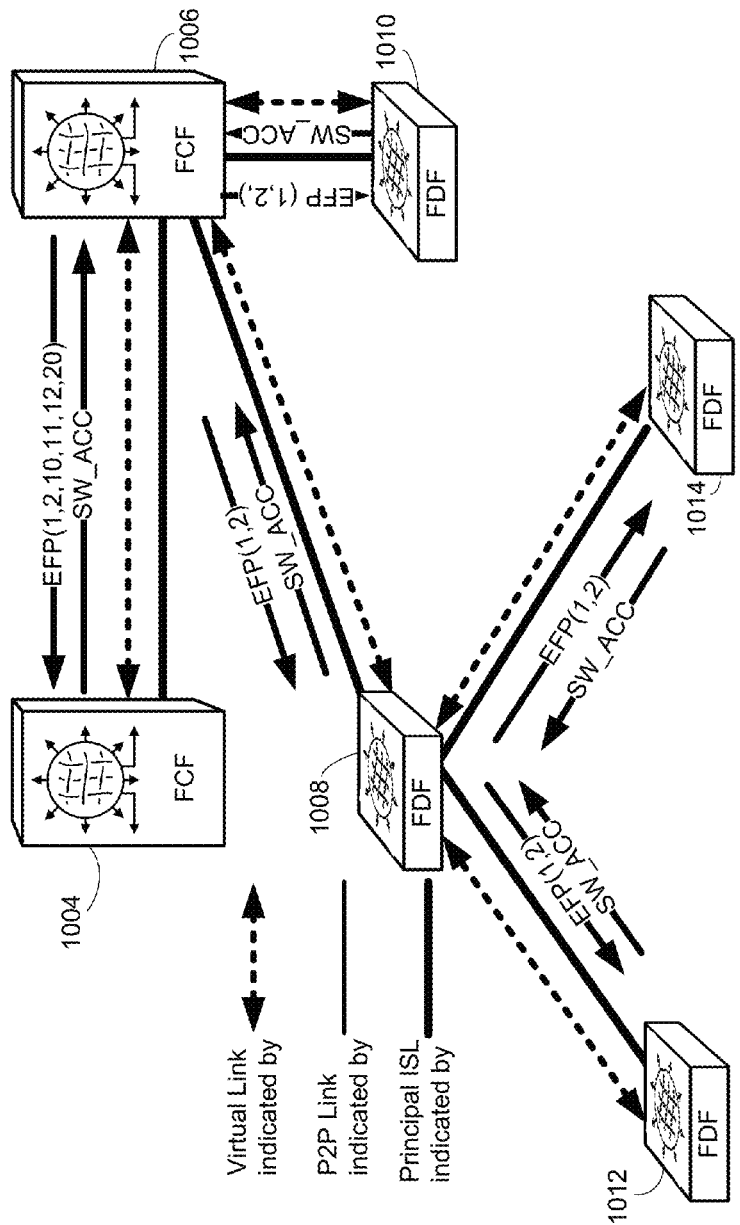

With the top level of FDF initialization operations complete, the next lower level of FDF initialization commences in FIG. 25. In FIG. 25 FDF 1008 sends DIA packets to the FDFs 1012 and 1014, which reply with acceptances. In FIG. 26 each of the FDFs request Domain_IDs of the FDF 1008, which then forwards the RDI requests to the master FCF 1006. The master FCF 1006 returns acceptances to the FDF 1012 for each of the requests, which are then provided through the FDF 1012 to the FDFs 1012, 1014. These acceptances include the SDIDs of the FDFs 1012, 1014. In the example, FDF 1012 receives SDID 11 and FDF 1014 receives SDID 12. With two more SDIDs provided, in FIG. 27 the master FCF 1006 provides EFP updates to all of the devices.

Figure 28:
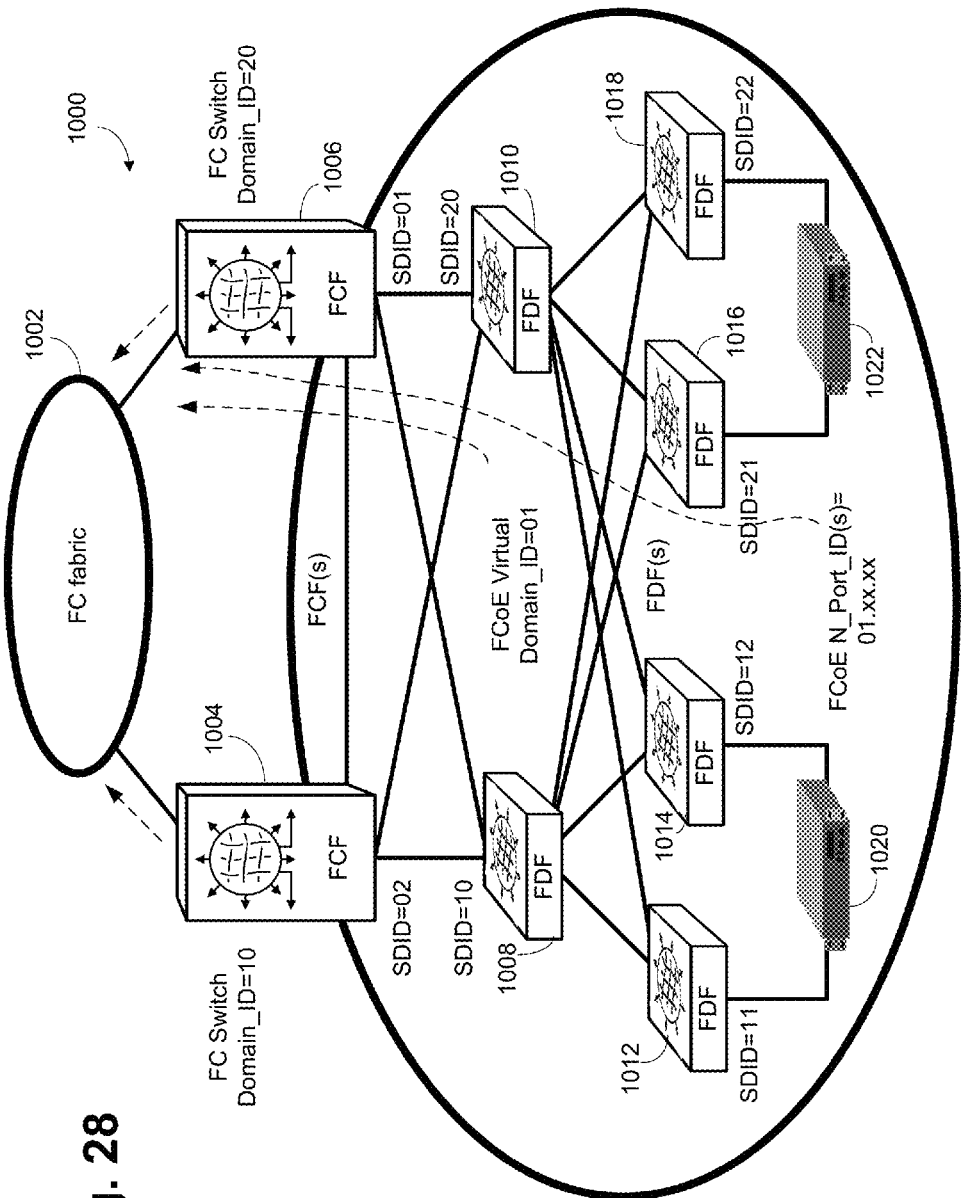
FIG. 28 illustrates example addresses for the FCoE fabric of FIG. 10 after subdomain addressing is complete.

FIG. 28 illustrates exemplary SDIDs for the embodiment of FIG. 10. As illustrated, the slave FCF 1004 has received an SDID of two, while the master FCF 1006 has allocated itself an SDID of one. The FDF 1008 receives an SDID of 10, while the FDF 1010 receives an SDID of 20. The FDF 1012 receives SDID of ii and the FDF 1014 receives SDID of 12, while the FDF 1016 receives an SDID of 21 and the FDF 1018 receives a SDID of 22. In all cases the virtual Domain_ID is still of and all of the VN_Port IDs are still 01.xx.xx.

Figure 29:
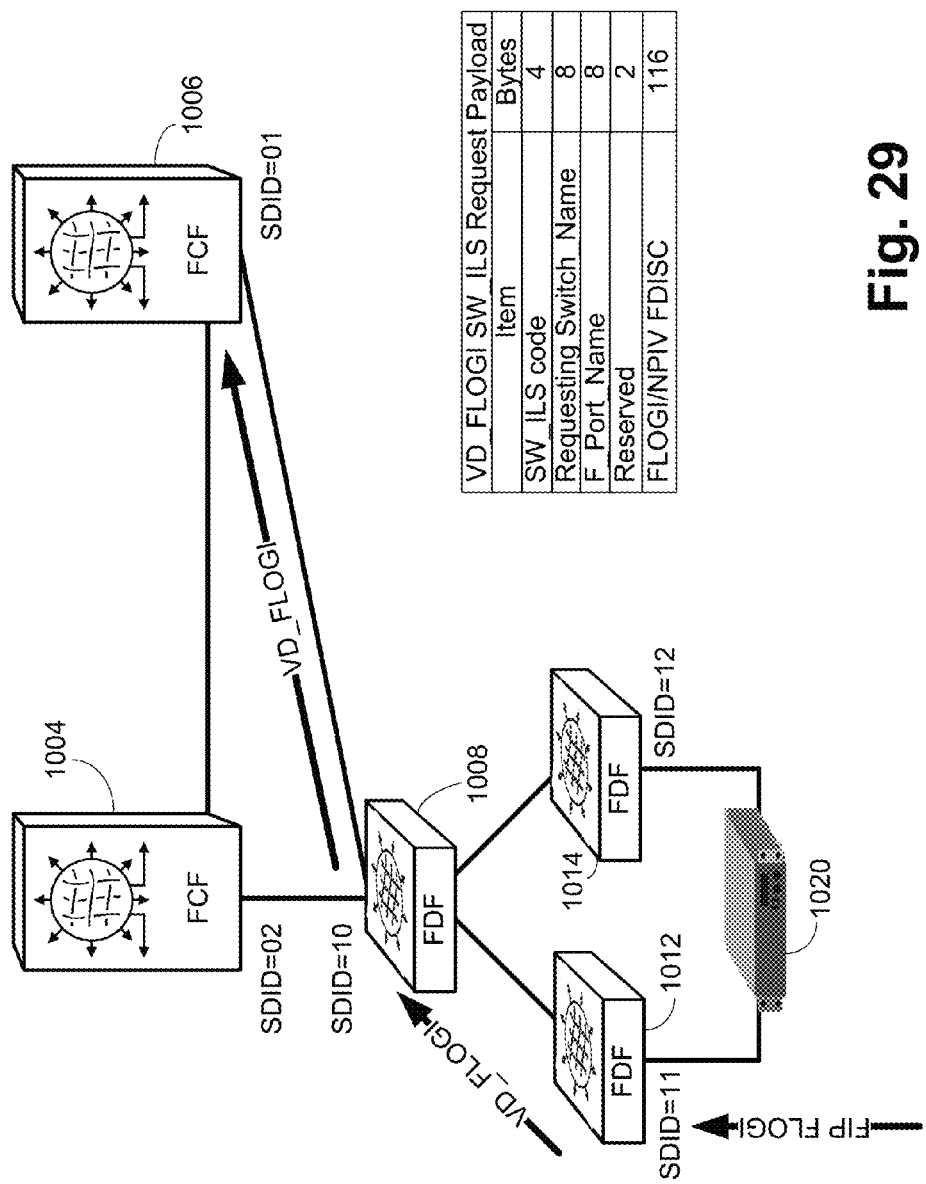
FIGS. 29 to 32 illustrate configuration of the ENodes in the FCoE fabric of FIG. 11 according to the present invention.
Figure 30:
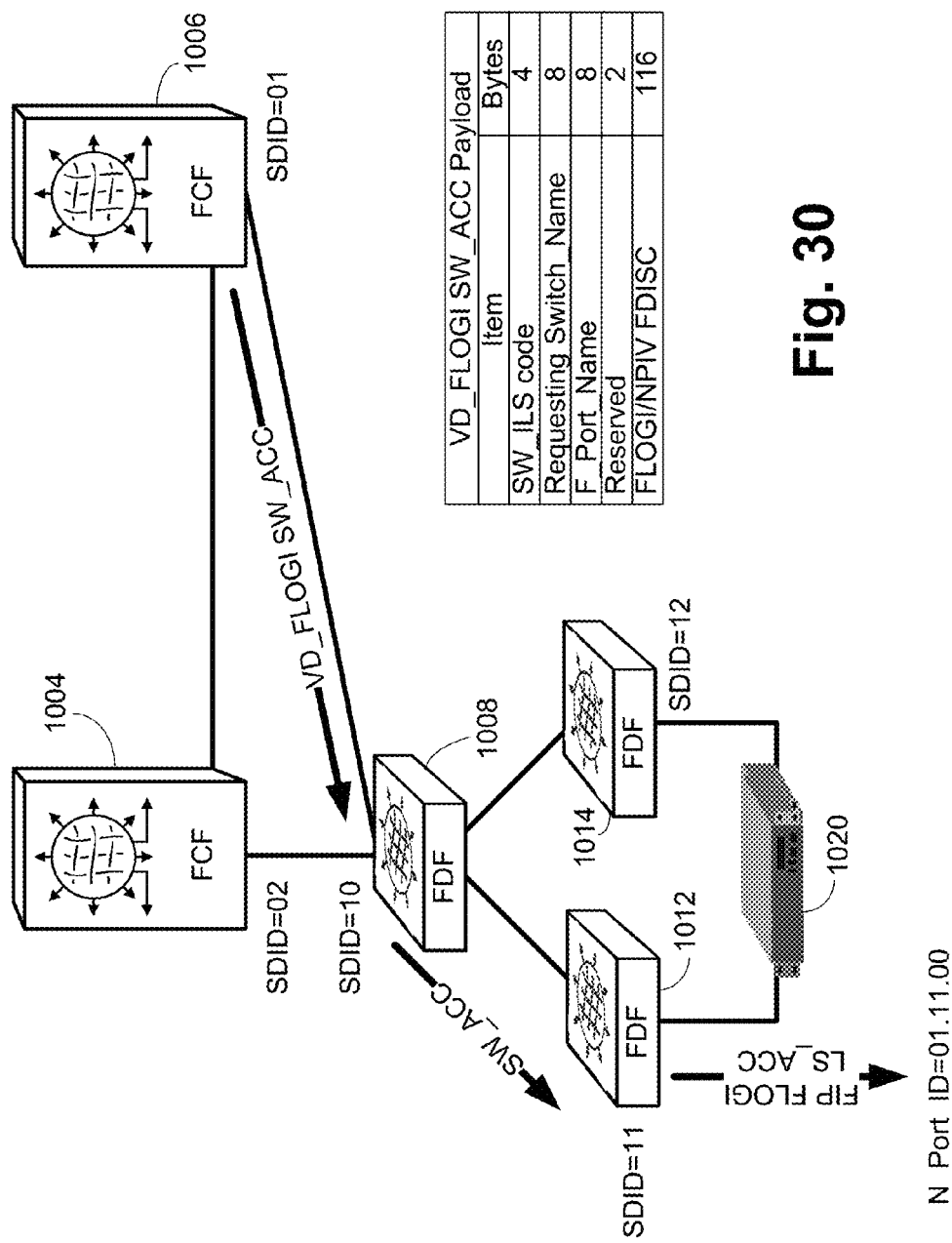

FIG. 29 illustrates the beginning of the login process for the ENodes according to another embodiment. The FIP VLAN and discovery phases are handled as described above and omitted here for clarity. The ENode 1020 issues a FIP FLOGI to log into the FCoE network. This is provided to the FDF 1012. In this embodiment a new command, virtual domain login or VD_FLOGI, is issued by the FDF 1012. The VD_FLOGI is similar to a regular FLOGI except that a field is added to indicate the requesting FDF name, effectively converting the FLOGI. This addition allows the master FCF to determine the FDF to which the ENode is connected, thus placing the ENode in the fabric topology and allowing assigning of VN_Port addresses based on the subdomain structure if desired. The FDF 1012 issues the VD_FLOGI to the FDF 1008, which then forwards it to the master FCF 1006. The master FCF 1006 in FIG. 30 replies with a VD_FLOGI acceptance, which is returned to the FDF 1008. The FDF 1008 converts the VD_FLOGI acceptance to a normal acceptance and provides that to the FDF 1012, which forwards the accept to the ENode 1020.

Figure 31:
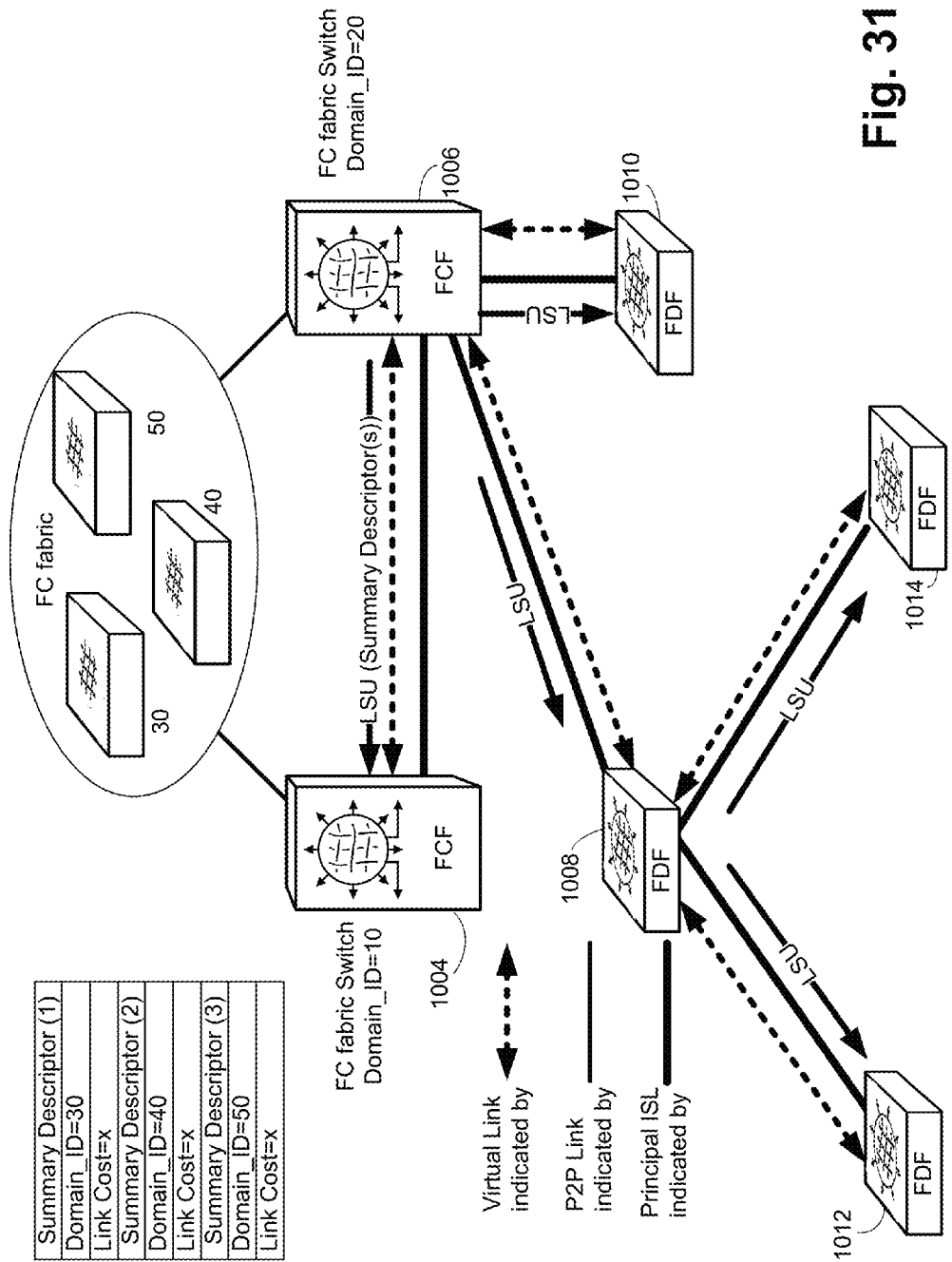

In FIG. 31 the master FCF 1006 sends a link state update (LSU) request with descriptors to all of the slave FCFs and to the FDFs so that they are all updated.

Figure 32:
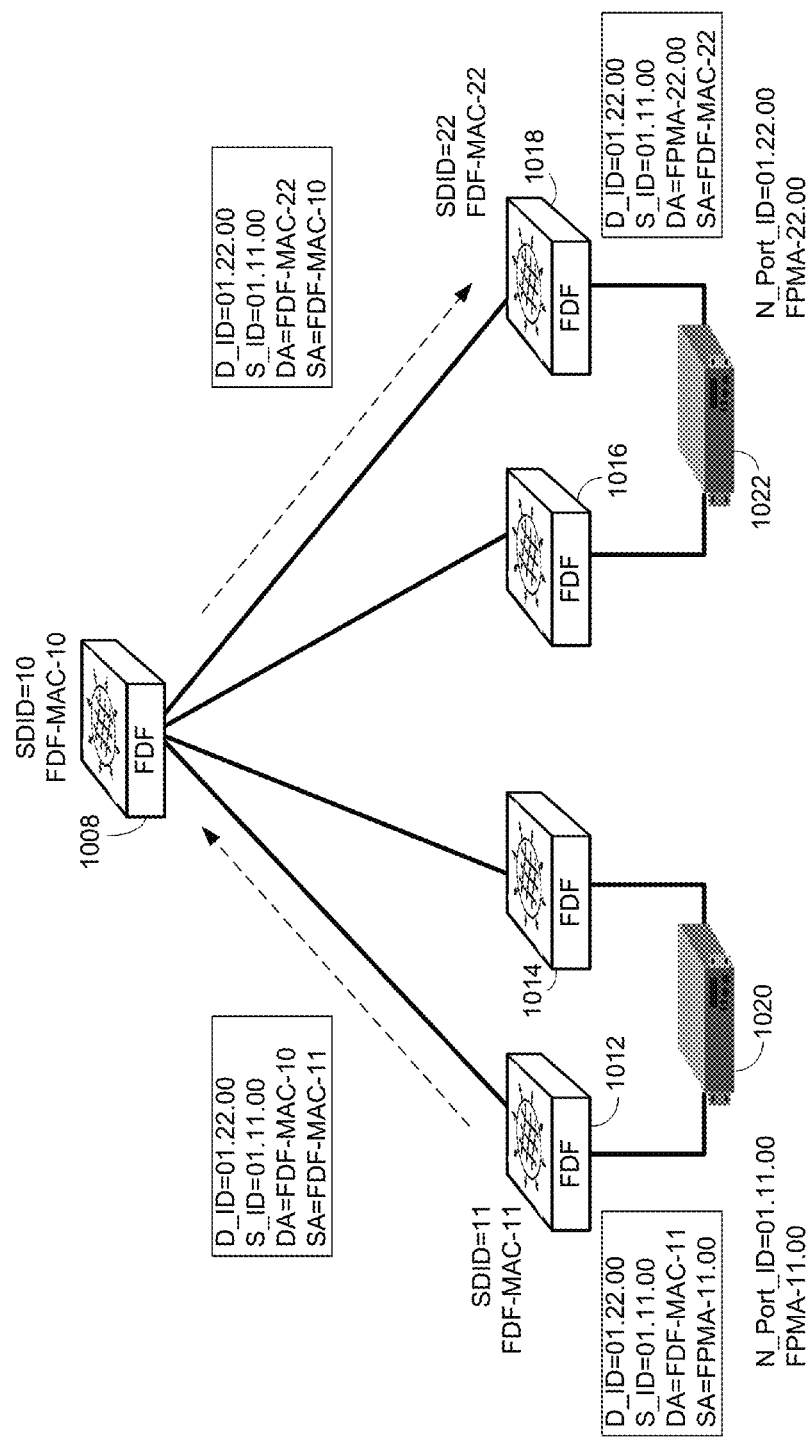

FIG. 32 illustrates peer-to-peer frame flow in the embodiment with subdomains. An ENode device 1020 having an ENode address of 01.11.00 and directing the frame to a destination ENode 1022 have an address of 01.22.00 issues a packet with the destination Ethernet address of the FDF 1012 and its own Ethernet source address. This packet has the Ethernet addresses translated by the FDF 1012 to have a destination address of the FDF 1008 and a source address of the FDF 1012. The FDF 1008 then converts the Ethernet addresses to a destination address of the FDF 1018 and a source address of the FDF 1008. The FDF 1018 then does the final conversion of Ethernet addresses to the destination address of the ENode 1022 and a source address of the FDF 1018.

Figure 33:
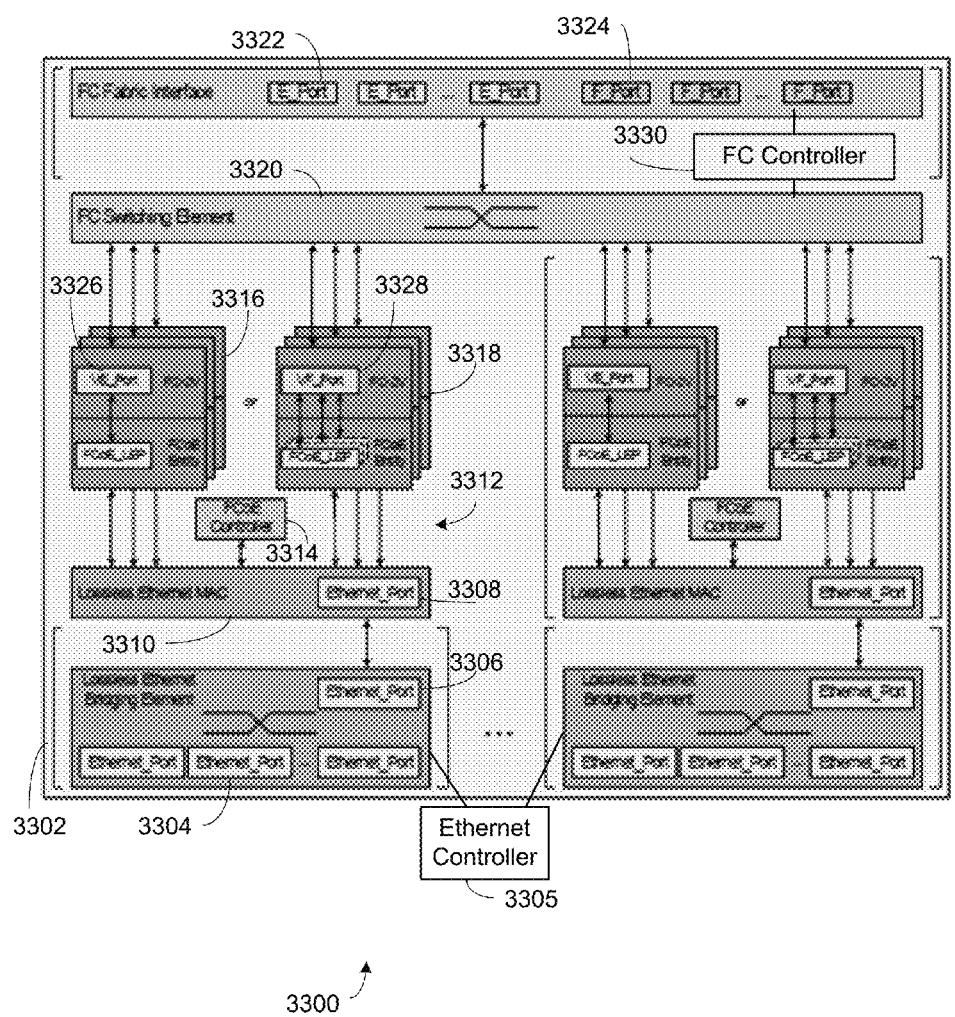
FIG. 33 is a functional model of an FCF according to the present invention.

FIG. 33 is a functional model of an FCF 3300. An optional lossless Ethernet bridging entity 3302 includes a series of Ethernet ports 3304 for external connections and an Ethernet port 3306 for connection to an Ethernet port 3308 of a lossless Ethernet MAC 3310 of an FCoE entity 3312. An Ethernet controller 3305 is provided to handle the normal Ethernet switch management and control functions. An FCoE controller 3314 is connected to the MAC 3310. The FCoE Controller 3314 is the functional entity that performs the FCoE Initialization Protocol (FIP) and instantiates or de-instantiates VE_Port/FCoE_LEP pairs or VF_Port/FCoE_LEP pairs as needed. Per the FC-BB-5 standard, for a VE_Port capable FCF-MAC, the FCoE Controller 3314:

a) optionally performs the FIP VLAN discovery protocol to discover FCoE VLANs;

b) discovers other VE_Port capable FCF-MACs connected to the same Lossless Ethernet network using the FIP discovery protocol;

c) instantiates a VE_Port/FCoE_LEP pair, such as pairs 3316, on successful completion of each FIP ELP Exchange with a remote FCF-MAC;

d) de-instantiates a VE_Port/FCoE_LEP pair on receiving a FIP Clear Virtual Link request;

e) monitors the status of the instantiated VE_Port/FCoE_LEP pairs;

f) initiates FIP Clear Virtual Link requests as needed to terminate Virtual Links to other VE_Ports;

g) transmits periodic FIP Discovery Advertisements to the All-FCF-MACs address every FKA_ADV_PERIOD; and h) monitors the status of remote VE_Ports by maintaining timers and verifying that periodic FIP Discovery Advertisements are received within every FKA_ADV_PERIOD.

For a VF_Port capable FCF-MAC, the FCoE Controller 3314:

a) participates in the FIP VLAN discovery protocol initiated by an ENode MAC;

b) participates in the FIP discovery protocol initiated by an ENode MAC;

c) instantiates a VF_Port/FCoE_LEP pair, such as pairs 3318, on successful completion of each FIP FLOGI Exchange initiated by an ENode MAC;

d) instantiates an additional FCoE_LEP on successful completion of each FIP NPIV FDISC Exchange initiated by an already logged in ENode MAC. The resulting VF_Port/FCoE_LEP pair shares the VF_Port with the VF_Port/FCoE_LEP pair instantiated on successful completion of the FIP FLOGI Exchange;

e) when a VN_Port is logged out, de-instantiates the FCoE_LEP associated to that VN_Port and de-instantiates the corresponding VF_Port if that FCoE_LEP was the only one associated with that VF_Port;

f) initiates FIP Clear Virtual Link requests as needed to terminate Virtual Links to VN_Ports;

g) monitors the status of the instantiated VF_Port/FCoE_LEP pairs;

h) transmits periodic FIP Discovery Advertisements to the All-ENode-MACs address every FKA_ADV_PERIOD;

i) monitors the status of the logged in ENode MACs by verifying that periodic FIP Keep Alive frames are received within FKA_ADV_PERIOD, unless the D bit is set to one in received Discovery Advertisements; and j) monitors the status of the logged in VN_Ports by maintaining timers and verifying that periodic FIP Keep Alive frames are received within FKA_VN_PERIOD, unless the D bit is set to one in received Discovery Advertisements.

An FC switching element 3320 is the functional entity performing Fibre Channel switching among E_Ports 3322, F_Ports 3324, VE_Ports 3326, and VF_Ports 3328. An FC controller 3330 is connected to FC ports and the FC switching element 3320 to perform normal FC switch control and management operations.

Figure 34:
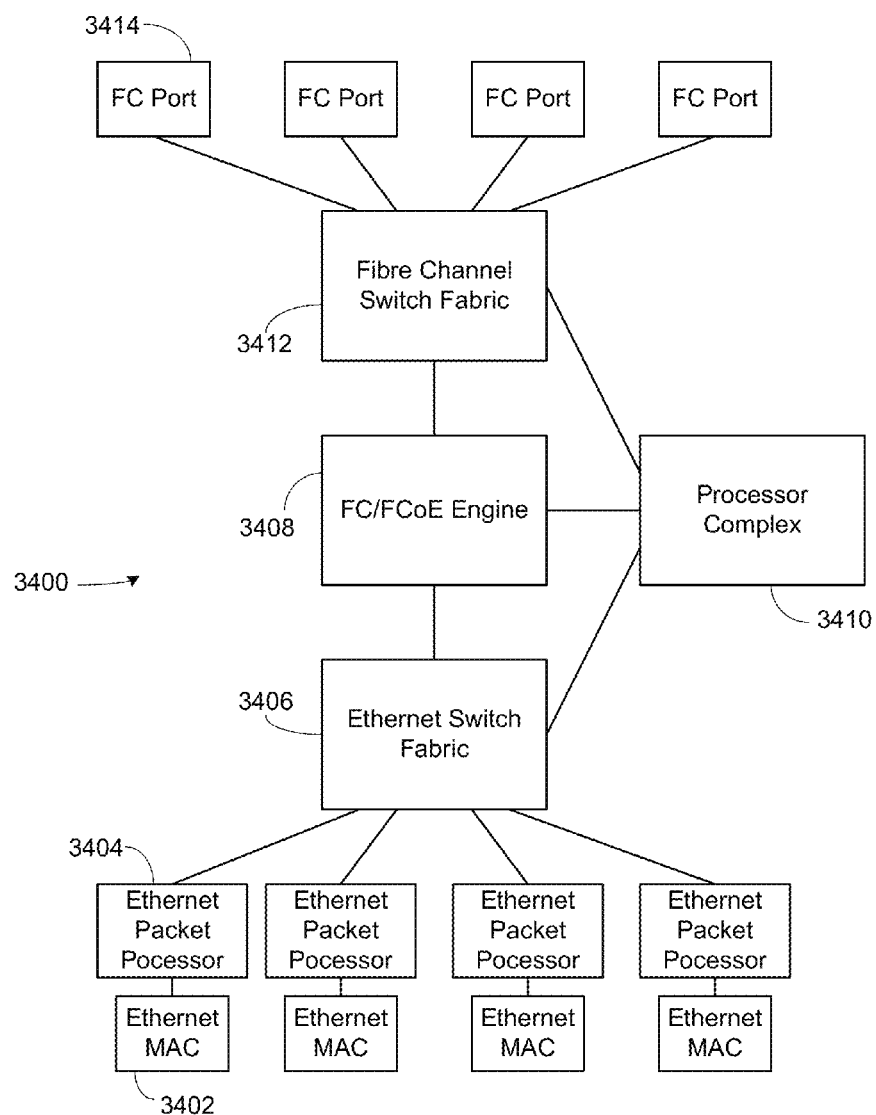
FIG. 34 is a block diagram of the FCF of FIG. 33.

Understanding that FIG. 33 is a functional model, FIG. 34 is a block diagram of a physical FCF 3400. Ethernet MACs 3402 provide the external connectivity and are connected internally to a packet processor 3404. The packet processor 3404 analyzes the incoming packets and determines if they are normal Ethernet data packets to be switched in an Ethernet switch fabric 3406 to other Ethernet ports, if they are FCoE data packets that can be provided to an FC/FCoE engine 3408, or are Ethernet or FCoE control packets, such as FIP packets, to be provided to a processor complex 3410 to be handled by the processor, memory and software program storage in the processor complex 3410. Thus the processor complex 3410 is the entity that performs the operations of the FCoE controller 3314, to a great extent. The packet is an FCoE packet destined to an FC fabric, the Fc/FCoE engine 3408 provides the FC packet to an FC switch fabric 3412, which then provides it to an FC port 3414. The FC ports 3414 will analyze incoming FC packets and determine if they are normal FC data traffic, which will be switched by the FC switch fabric 3412 to other FC ports 3414; if they are FC control traffic, which will be switched to the processor complex 3410 as the processor complex 3410 is also acting as the processor of a normal FC switch; or if they are data packets to be converted to FCoE packets, which will be provided to the FC/FCoE engine 3408. It is understood that this is an exemplary block diagram and other block diagrams may be used and the actual physical construction may vary as well.

Figure 35:
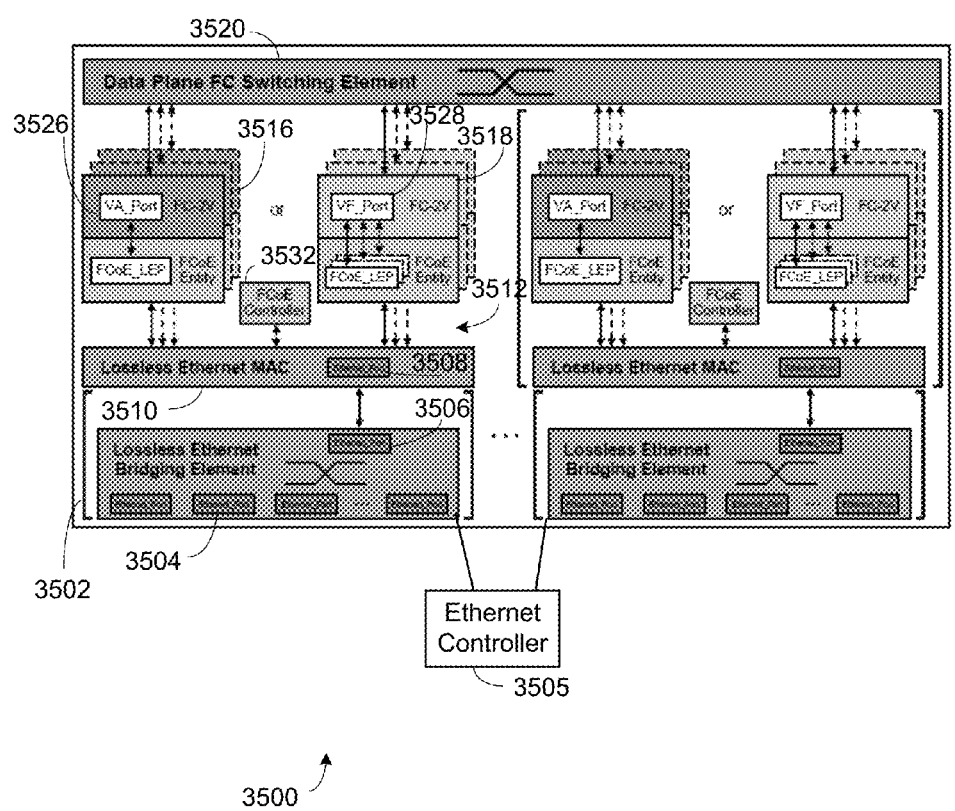
FIG. 35 is a functional model of an FDF according to the present invention.

FIG. 35 is the functional model of an FDF 3500. As can be seen, the FDF 3500 is similar to the FCF 3300 but it does not have FC ports and VA_Ports, ports to connect the FDF to other FDFs or to FCFs, are present instead of VE_ports. Therefore like numbers are used between FIGS. 33 and 35. The FCoE controller 3532 does differ from the FCoE controller 3314 enough to deserve a different number. While the FCoE controller 3532 will do most of the items mentioned above for the FCoE controller 3314, noting that VA_Ports are present instead of VE_Ports, the FCoE controller 3532 must also terminate or proxy the FIP operations as discussed above and perform the FIP conversions and the like. Further, it must also handle the MAC address changes for the FCoE traffic as discussed above. The FDF 3500 is simpler than the FCF 3300 in many aspects, as it does not include FC ports or an FC controller.

Figure 36:
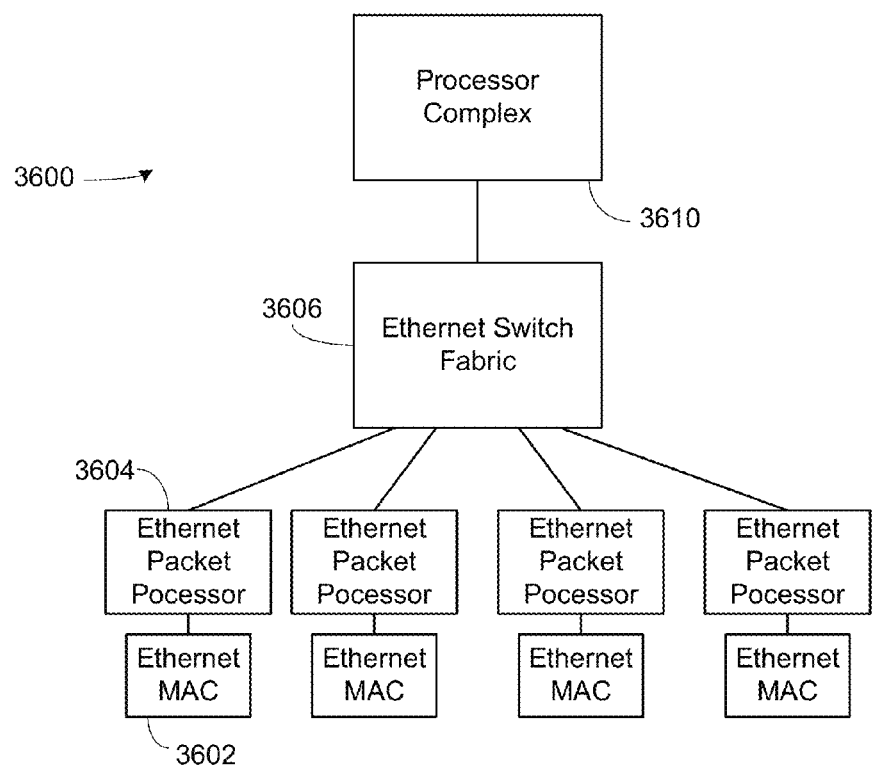
FIG. 36 is a block diagram of the FDF of FIG. 35.

FIG. 36 is a block diagram of physical FDF 3600. In general the FDF 3600 is similar to the Ethernet portions of the FCF 3400, so like numbers have been used. The packet processors are slightly simplified as there is no FC/FCoE engine for routing, the only decisions being to other ports or to the processor complex 3610.

The use of the virtual Domain_ID different from the Domain_IDs of the FCFs for the FCoE fabric addresses the Domain_ID exhaustion concerns but allows multipathing and failover in conjunction with the master and slave FCFs. The FCFs can determine the master and slave relationship, with the master FCF then acting generally as a principal switch in FC. The master FCF provides VN_Port addresses and routing in some embodiments. FDFs are connected to the FCFs and to other FDFs. The FDFs proxy some of the FIP operations but forward the FLOGI and FDISC operations to the master FCF for address assignment, though a modified or converted format may be used from the FDF.

The presentation entitled "Virtual Domain, T11/10-345v2," available from the FC-BB-6 documents portion of the T11.org website with the date of Dec. 8, 2010, a title of "FC-BB-6: Virtual Domain" and a reference number of T11/10-345v2 is hereby incorporated for reference.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A Fibre Channel over Ethernet (FCoE) network comprising:
   at least one FCoE forwarder (FCF) including a master FCF, wherein each FCF has a Fibre Channel (FC) Domain_ID;
   at least one FCoE data forwarder (FDF) coupled to said at least one FCF; and
   a plurality of ENodes coupled to said at least one FDF,
   wherein said master FCF is responsible for assigning FC IDs to said plurality of ENodes and assigns FC IDs to said plurality of ENodes so that all of said ENodes are addressed as being in a single domain, the Domain_ID of that single domain being different than the Domain_IDs of any FCF of said at least one FCF.

2. The FCoE network of claim 1, wherein said at least one FCF includes first and second FCFs which are coupled together, and
   wherein said first and second FCFs perform operations to determine said master FCF between themselves.

3. The FCoE network of claim 1, wherein each of the plurality of ENodes provides FCoE Initialization Protocol (FIP) operations directed to said at least one FCF, and
   wherein an FDF coupled to an ENode proxies at least some of said FIP operations for said at least one FCF.

4. The FCoE network of claim 3, wherein said FIP operations proxied include at least one of FIP VLAN discovery and notification, FIP discovery solicitation and advertisement, and FIP unsolicited advertisement and link keep alive.

5. The FCoE network of claim 1, wherein each of said plurality of ENodes provides FCoE Initialization Protocol (FIP) login requests directed to said at least one FCF,
   wherein an FDF coupled to an ENode receives said FIP login requests, converts said FIP login requests to include information identifying the receiving FDF and provides said converted FIP login request to said primary FCF, and
   wherein said master FCF replies to said converted FIP login request with a FIP login acceptance identifying the receiving FDF.

6. The FCoE network of claim 5, wherein said FIP login requests include FIP FLOGI and FIP FDISC.

7. The FCoE network of claim 1, wherein said at least one FDF includes at least two FDFs coupled in series between an ENode and said primary FCF, the FDF coupled directly and closest to said primary FCF being a top level FDF and the FDFs farther from said primary FCF being lower level FDFs.

8. The FCoE network of claim 7, wherein said top level FDF cooperates with a next lower level FDF to instantiate a virtual link between said top level FDF and said next lower level FDF.

9. The FCoE network of claim 1, wherein said at least one FDF includes at least two FDFs coupled together and coupled directly and equally close to said primary FCF, such FDFs being top level FDFs.

10. The FCoE network of claim 9, wherein said top level FDFs cooperate to instantiate a virtual link between each pair of top level FDFs.

11. The FCoE network of claim 9, wherein said at least one FDF includes at least three FDFs, at least two FDFs coupled in series between an ENode and said primary FCF, an FDF coupled directly and closest to said primary FCF being a top level FDF and the FDFs farther from said primary FCF being lower level FDFs.

12. The FCoE network of claim 11, wherein said top level FDF cooperates with a next lower level FDF to instantiate a virtual link between said top level FDF and said next lower level FDF.

13. A Fibre Channel over Ethernet (FCoE) forwarder (FCF) comprising:
at least one Fibre Channel (FC) port for receiving and transmitting FC packets;
at least one FCoE port for receiving and transmitting FCoE packets;
a processor coupled to said at least one FCoE port; and
software executing on said processor, said software causing the FCF to obtain an FC Domain_ID for the FCF and to assign FC addresses in a single domain to any coupled FCoE ENodes, the Domain_ID of said single domain being different than the Domain_ID of the FCF,
wherein said software causes the FCF to reply to a converted FCoE Initialization Protocol (FIP) login request, the converted FIP login request being a normal FIP login request which includes information identifying the receiving FCoE data forwarder (FDF), with a FIP login acceptance identifying the receiving FDF.

14. The FCF of claim 13, wherein said software causes the FCF to cooperate with any other FCFs to determine the master FCF from among the FCFs.

15. The FCF of claim 13, wherein normal FIP login requests include FIP FLOGI and FIP FDISC.

16. A Fibre Channel over Ethernet (FCoE) data forwarder (FDF) comprising:
at least one FCoE port for receiving and transmitting FCoE packets;
a processor coupled to said at least one FCoE port; and
software executing on said processor, said software causing the FDF to instantiate a virtual link to an FDF at the same level from the primary Fibre Channel over Ethernet forwarder (FCF) or to an FDF one level away from the level of the FDF.

17. The FDF of claim 16, wherein said software causes the FDF to instantiate a virtual link between an FDF at the same level from the primary FCF and to an FDF one level away from the level of the FDF.

18. A method comprising:
receiving Fibre Channel (FC) Domain_ID values at Fibre Channel over Ethernet (FCoE) forwarders (FCFs); and
assigning FC IDs to all ENodes in an FCoE fabric so that all of the ENodes are addressed as being in a single domain, the Domain_ID of that single domain being different than the Domain_IDs of any FCF of the FCFs,
replying to a converted FCoE Initialization Protocol (FIP) login request, the converted FIP login request being a normal FIP login request which includes information identifying the receiving FCoE data forwarder (FDF), with a FIP login acceptance identifying the receiving FDF.

19. The method of claim 18, further comprising:
performing operations by first and second FCFs to determine a master FCF between them.

20. The method of claim 18, wherein normal FIP login requests include FIP FLOGI and FIP FDISC.

21. A method comprising:
instantiating, by a Fibre Channel over Ethernet (FCoE) data forwarder (FDF), a virtual link to an FDF at the same level from a primary FCoE forwarder (FCF); or
instantiating, by an FDF, a virtual link to an FDF one level away from the level of the FDF.

22. The method of claim 21, further comprising instantiating, by an FDF, both virtual links.

* * * * *